(12) United States Patent
Ohtsu

(10) Patent No.: US 6,600,987 B2
(45) Date of Patent: Jul. 29, 2003

(54) APPARATUS AND METHOD FOR DETERMINING A ROAD-WHEEL VIBRATION OF AUTOMOTIVE VEHICLE, AND APPARATUS AND METHOD FOR ANTI-SKID CONTROL USING THE SAME

(75) Inventor: Nobuyuki Ohtsu, Kanagawa (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/885,109

(22) Filed: Jun. 21, 2001

(65) Prior Publication Data

US 2002/0002435 A1 Jan. 3, 2002

(30) Foreign Application Priority Data

Jun. 29, 2000 (JP) ........................... 2000-196390

(51) Int. Cl.$^7$ .............................. G06F 7/70; B60B 36/00
(52) U.S. Cl. .......................... 701/71; 701/78; 701/82; 303/155; 303/157
(58) Field of Search .......................... 701/71, 36, 70, 701/72, 80, 79, 78; 303/156, 158, 177, 183, 112, 175, 154, 196, 184, 150, 121, 122.03, 122.09, 157, 155; 73/118.1

(56) References Cited

U.S. PATENT DOCUMENTS

| | | | |
|---|---|---|---|
| 4,701,855 A | | 10/1987 | Fennel .......................... 701/70 |
| 4,883,325 A | | 11/1989 | Shimanuki et al. ........... 303/96 |
| 5,332,301 A | * | 7/1994 | Roll et al. ............. 188/DIG. 1 |
| 5,425,574 A | * | 6/1995 | Sano .......................... 303/154 |
| 5,522,652 A | * | 6/1996 | Negrin et al. ................ 303/154 |
| 5,719,565 A | | 2/1998 | Tsuno et al. ................. 340/905 |
| 5,913,576 A | * | 6/1999 | Naito et al. .................. 303/112 |
| 5,952,564 A | * | 9/1999 | Naito et al. ................ 73/118.1 |
| 6,217,134 B1 | * | 4/2001 | Kato et al. .................... 303/156 |
| 6,385,524 B2 | * | 5/2002 | Hano et al. .................... 701/70 |

FOREIGN PATENT DOCUMENTS

JP 7-257347 10/1995

* cited by examiner

Primary Examiner—Jacques H. Louis-Jacques
(74) Attorney, Agent, or Firm—Sughrue Mion, PLLC

(57) ABSTRACT

An apparatus for determining a road-wheel vibration for an automotive vehicle comprises wheel-speed sensors for detecting wheel speeds of each of road wheels, and a control unit which is configured to be electrically connected to the wheel-speed sensors for processing a wheel-speed data signal detected from each of the wheel-speed sensors. The control unit comprises a wheel acceleration calculating section for calculating a wheel acceleration and a wheel deceleration of each of the road wheels based on the wheel-speed data signal, a wheel acceleration cycle calculating section for calculating a wheel acceleration cycle of each of the road wheels, a vehicle deceleration calculating section for calculating a vehicle deceleration, a vibration detecting section for detecting a road-wheel vibration of the road wheel based on at least the wheel acceleration cycle, and a vibration determining section for determining whether the road-wheel vibration is caused by a bad road surface condition, or the road-wheel vibration is caused by a drive-train vibration of the automotive vehicle, based on the vehicle deceleration.

48 Claims, 17 Drawing Sheets

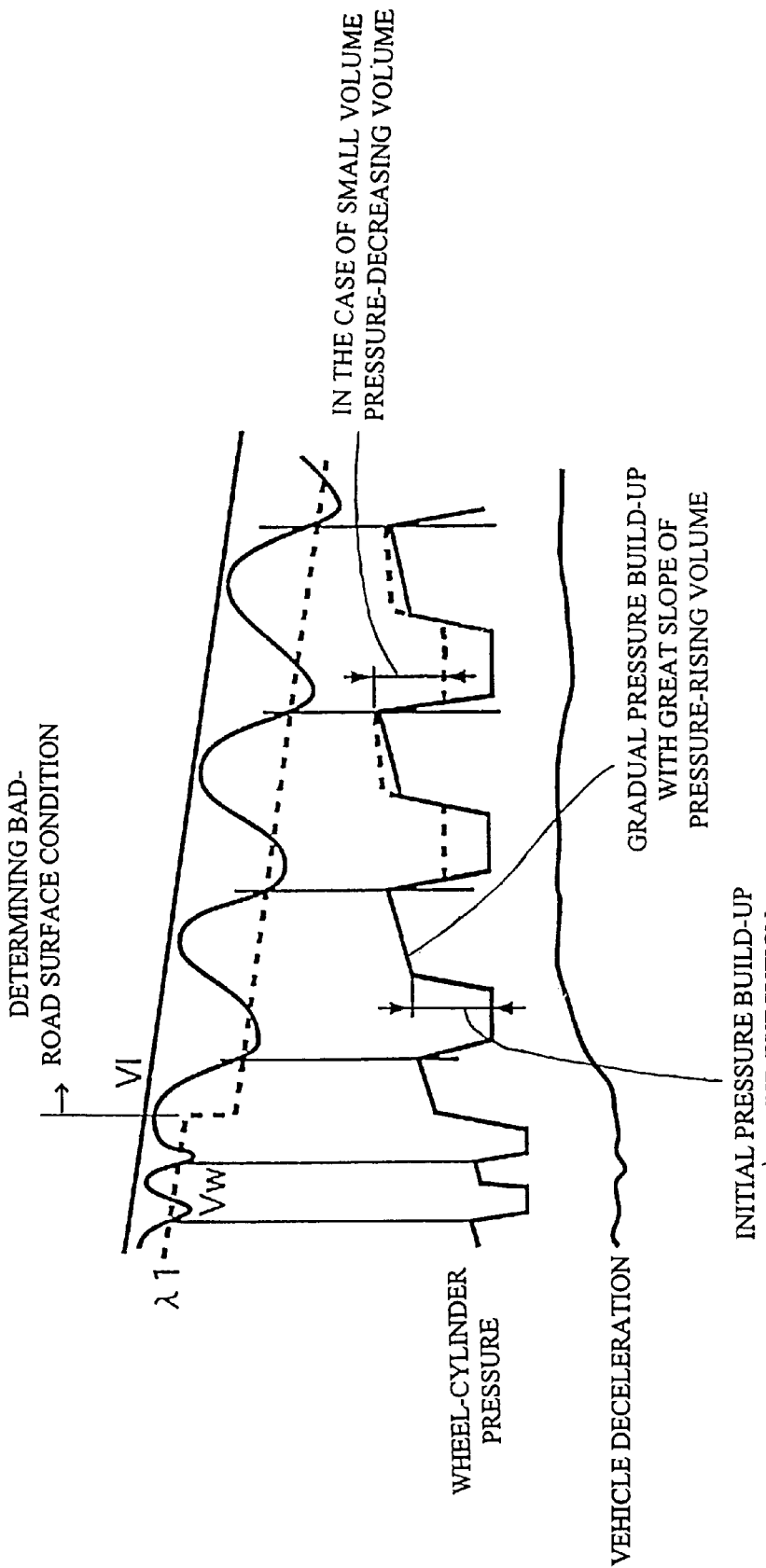
FIG. 10 (a) BRAKING IN BAD-ROAD SURFACE CONDITION

BRAKING IN CONDITION OF DRIVE-TRAIN VIBRATION

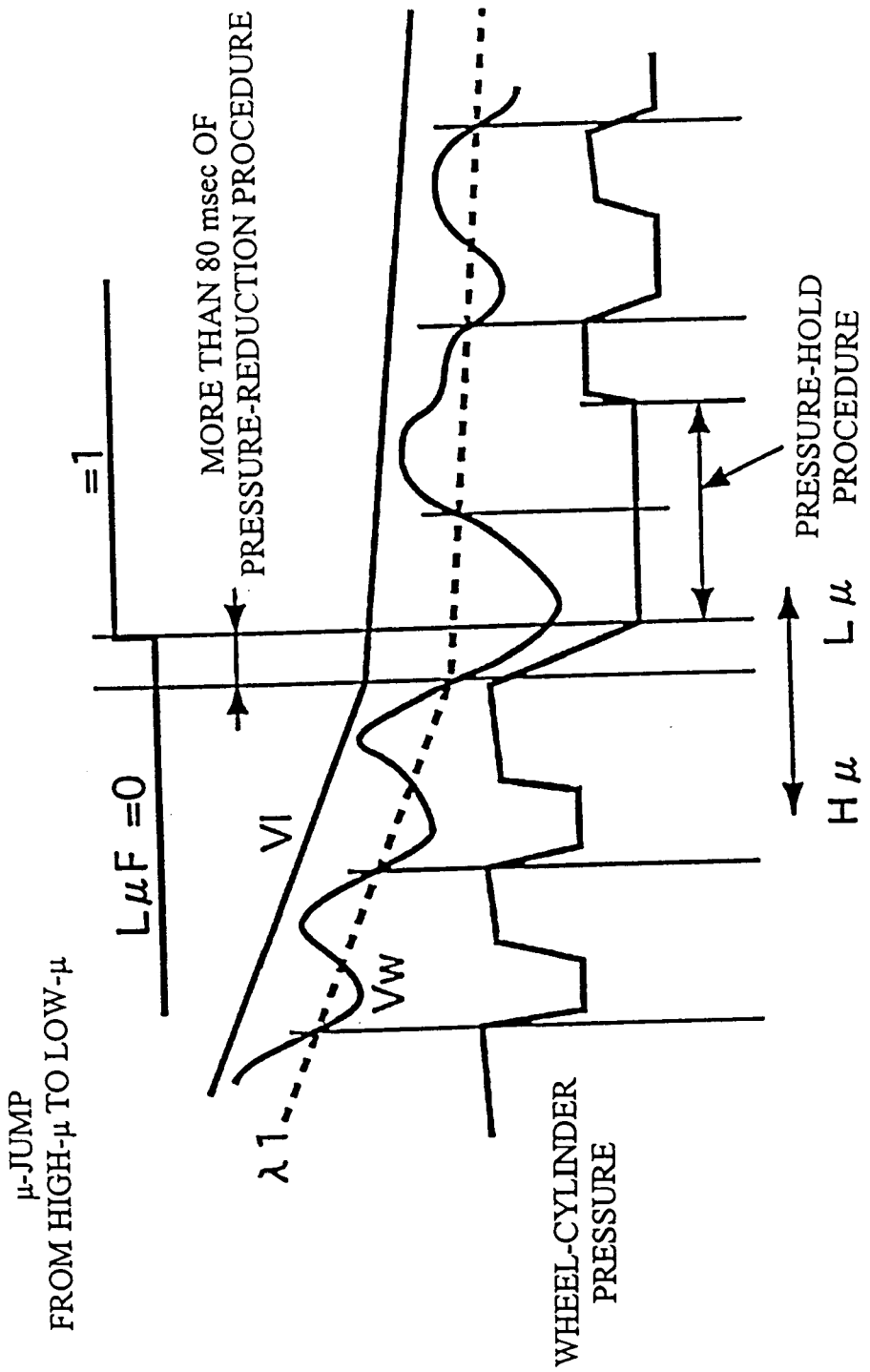

APPARATUS AND METHOD FOR DETERMINING A ROAD-WHEEL VIBRATION OF AUTOMOTIVE VEHICLE, AND APPARATUS AND METHOD FOR ANTI-SKID CONTROL USING THE SAME

BACKGROUND OF THE INVENTION

1. Field of the Invention

This invention relates to an improvement of determining a road-wheel vibration of an automotive vehicle that is caused by a road surface condition, and especially, to an anti-skid braking system that executes a skid control procedure depending on the road-wheel vibration determined by a road-wheel vibration determining system.

2. Description of the Related Art

As is generally known, there have been proposed various anti-skid braking systems for automotive vehicles (hereinafter, referred to as "ABS") that prevent a skid of the road wheel during a braking in order to provide a maximum effective braking. The ABS executes a skid control by regulating a pressure of each wheel-brake cylinder mounted to each of the road wheels, depending on a pressure-reduction threshold that is calculated based on a wheel speed of each of the road wheels in a vehicle traveling condition. For instance, when the wheel speed becomes lower than a pressure-reduction threshold value, that is, the road wheel tends to be locked, the ABS executes a pressure-reduction procedure of the wheel-brake cylinder pressure. In contrast, when the wheel speed becomes higher than the pressure-reduction threshold value, the ABS executes a pressure build-up procedure so as to adjust the wheel speed toward the pressure-reduction threshold value. By repeating the pressure-reduction procedure and the pressure build-up procedure, a minimum braking distance can be provided. When skid control is executed in a bad road surface condition, the bad road surface condition causes a road-wheel vibration. Thus, if the ABS executes the skid control depending on the same pressure-reduction threshold value that is calculated in a normal road surface condition, the wheel speed fluctuates around the pressure-reduction threshold at a high-frequency that causes a frequent execution of the pressure-reduction procedure. Thereby, a braking distance tends to be long.

As a measure of the foregoing problem, there have been proposed another type of anti-skid braking system that sets the pressure-reduction threshold at a lower value as compared to a normal value set in the normal road surface condition when the bad road surface condition is determined. According to a conventional manner, the bad road surface condition is determined when the wheel speed cycle becomes lower than a predetermined value.

However, during the skid control, the road-wheel vibration is sometimes caused by a drive-train vibration. In this case, when the bad road surface condition is determined by the conventional manner, the drive-train vibration might be determined to be a road-wheel vibration that is caused by the bad road surface condition. Particularly, in a low coefficient of friction of the road surface condition (hereinafter, a coefficient of friction of the road surface is referred to as "$\mu$"), if the pressure-reduction threshold is set at the lower value due to such determination, the pressure-reduction procedure tends to be executed late as a result of setting the pressure-reduction threshold at the lower value. Thereby, a skid of the road wheel might occur. Furthermore, since a range of a pressure-reduction volume and a pressure build-up volume tend to be large because of such late execution of the pressure-reduction procedure, a hunting of an execution of the skid control may occur.

A torque of an engine is transmitted from an engine to driving wheels via a drive shaft and a differential gear. When the ABS executes the pressure build-up procedure and the pressure-reduction procedure while the torque is accelerating the automotive vehicle, a phase shift of the torque is sometimes made due to a generation of an interference of the torque among the engine, the drive shaft, the differential gear and the driving wheel that causes a resonance of 6–7 Hz. Furthermore, in case of a four-wheel drive vehicle, which has a strong constraint force between a front axle and a rear axle, if an inverse phase of the torque is generated by an inverse timing of executing the pressure build-up procedure between the front axle and the rear axle, a torsional resonance is generated on the drive shaft.

In order to solve aforementioned problem, there has been proposed the another type of ABS having a vibration determining system that determines whether the road-wheel vibration is caused by the bad road surface condition, or the road-wheel vibration is caused by the drive-train vibration. One such vibration determining system is disclosed in a Japanese patent publication (koukai) No. 7-257347. According to the publication, the road-wheel vibration is detected based on a wheel acceleration cycle and a wheel acceleration amplitude, and then, the road-wheel vibration is determined whether the road-wheel vibration is caused by the bad road surface condition, or the road-wheel vibration is caused by the drive-train vibration based on a wheel acceleration. When the ABS determines that the road-wheel vibration is caused by the bad road surface condition, the ABS sets the pressure-reduction threshold at the lower value as compared to the normal value set in the normal road surface condition. Thereby, a tendency of the road wheel to be locked caused by the late execution of the pressure-reduction proceeding is avoided. When a drive-train vibration is identified, the pressure-reduction threshold is not changed.

However, since a change of the wheel speed varies in a bad road surface condition, the same wheel acceleration generated in a case where the drive-train vibration is causing the road-wheel vibration is sometimes made in the bad road surface condition. In this case, according to the conventional manner, since the road-wheel vibration is determined based on the wheel acceleration, the ABS determines that the road-wheel vibration is caused by the drive-train vibration, and thus, the pressure-reduction threshold is not changed. Thereby, an insufficient braking force may be made.

In case of the four-wheel drive vehicle, during a traveling in a four-wheel drive state, the ABS might determine that the road-wheel vibration is caused by the bad road surface condition, when the torsional resonance is generated on the drive shaft by a braking. As a result of such determination, the ABS sets the pressure-reduction threshold at the lower value, and the road wheel tends to be locked that causes an instability of the vehicle. Thereby, a late pressure-reduction procedure, which causes a tendency of the range of the pressure-reduction volume and the pressure build-up volume to be wide, is executed, and therefore, the hunting of the execution of the skid control that would encourage the drive-train vibration may occur. According to the related art disclosed in the publication, although the ABS sets the pressure-reduction threshold at the lower value when the bad road surface condition is determined, the minimum braking distance cannot be provided by simply setting the pressure-reduction threshold at the lower value. Moreover, although the ABS disclosed in the related art sets the pressure-reduction threshold at a higher value as compared to the normal value when the drive-train vibration is determined, the drive-train vibration cannot be inhibited due to a repeated execution of the pressure-reduction procedure and the pressure build-up procedure.

SUMMARY OF THE INVENTION

Accordingly, in view of above described problems, a principal object of the present invention is to provide an improved method of determining a road-wheel vibration and a method of executing an anti-skid control having a road-wheel vibration determining method, and an anti-skid control system using the same method, by which the road-wheel vibration is accurately determined, whether a bad road surface condition causes the road-wheel vibration or a drive-train vibration causes the road-wheel vibration.

Another object of the present invention is to provide an anti-skid braking system that provides a maximum effective braking with a minimum braking distance in a bad road surface condition.

Still another object of the present invention is to inhibit the drive-train vibration.

In order to achieve these and the other objects, a first aspect of the present invention provides a method of determining a road-wheel vibration that comprises the operations of detecting a wheel speed of each of road wheels, calculating a wheel acceleration and a wheel deceleration of each of the road wheels, calculating a wheel acceleration cycle of each of the road wheels, calculating a vehicle deceleration, detecting the road-wheel vibration based on the calculated wheel acceleration cycle, and determining whether the road-wheel vibration is caused by a bad road surface condition, or the road-wheel vibration is caused by a drive-train vibration, based on the calculated vehicle deceleration.

According to another aspect of the invention, a method of executing a skid control comprises the operations of detecting a wheel speed of each of road wheels, calculating a wheel acceleration and a wheel deceleration of each of the road wheels, calculating a wheel acceleration cycle of each of the road wheels, calculating a vehicle deceleration. Comparing the calculated wheel acceleration to a first predetermined value, and comparing the calculated wheel acceleration cycle to a second predetermined value, and in response to such comparisons, detecting a road-wheel vibration when the calculated wheel acceleration is larger than the first predetermined value, and when the calculated wheel acceleration cycle is smaller than the second predetermined value. Comparing the calculated vehicle deceleration to a third predetermined value, and in response to such comparison, determining that the road-wheel vibration is caused by a bad road surface condition when the calculated vehicle deceleration is larger than the third predetermined value, and that the road-wheel vibration is caused by a drive-train vibration when the calculated vehicle deceleration is smaller than the third predetermined value. Setting a pressure-reduction threshold depending on the operations of the detecting the road-wheel vibration and determining the road-wheel vibration. The operation of setting the pressure-reduction threshold sets the pressure-reduction threshold value at a lower value as compared to a normal road surface condition when the bad road surface condition is determined, and the operation of setting the pressure-reduction threshold sets the pressure-reduction threshold value at a higher value as compared to the normal road surface condition when the drive-train vibration is determined. And executing a skid control by regulating each wheel-brake cylinder pressure, the operation of executing the skid control executes a pressure build-up procedure, a pressure-reduction procedure, and a pressure-hold procedure depending on the pressure-reduction threshold set by said operation.

According to still another aspect of the invention, there is provided a road-wheel vibration determining system for an automotive vehicle that comprises wheel-speed sensors for detecting wheel speeds of each of road wheels, and a control unit that is configured to be electrically connected to the wheel-speed sensors for processing a wheel-speed data signal detected from each of the wheel-speed sensors. The control unit comprises a wheel acceleration calculating section for calculating a wheel acceleration and a wheel deceleration of each of the road wheels based on the wheel-speed data signal, a wheel acceleration cycle calculating section for calculating a wheel acceleration cycle of each of the road wheels, a vehicle deceleration calculating section for calculating a vehicle deceleration, a vibration detecting section for detecting a road-wheel vibration of the road wheel based on at least the wheel acceleration cycle, and a vibration determining section for determining whether the road-wheel vibration is caused by a bad road surface condition, or the road-wheel vibration is caused by a drive-train vibration of the automotive vehicle, based on the vehicle deceleration.

According to further aspect of the invention, an anti-skid braking system comprises wheel-speed sensors for detecting the wheel speed of each of road wheels, and a hydraulic brake unit for regulating wheel-brake cylinder pressure of wheel-brake cylinders mounted to each of the road wheels. The hydraulic brake unit is capable of forming a pressure build-up mode, a pressure-reduction mode, and a pressure-hold mode of each of the wheel-brake cylinders. There also is a control unit that is configured to be electrically connected to the wheel-speed sensors for processing a wheel-speed data signal detected from each of the wheel-speed sensors. The control unit comprises a wheel acceleration calculating section for calculating a wheel acceleration and a wheel deceleration of each of the road wheels based on the wheel-speed data signal, a wheel acceleration cycle calculating section for calculating a wheel acceleration cycle of each of the road wheels, a vehicle deceleration calculating section for calculating a vehicle deceleration, and a vibration detecting section for detecting a road-wheel vibration of the road wheel based on the wheel acceleration and the wheel acceleration cycle. The vibration detecting section detects the road-wheel vibration when the wheel acceleration is larger than a first predetermined value, and when the wheel acceleration cycle is smaller than a second predetermined value. There also is a vibration determining section for determining whether the road-wheel vibration is caused by a bad road surface condition, or the road-wheel vibration is caused by a drive-train vibration of the automotive vehicle. The vibration determining section determines that the road-wheel vibration is caused by the bad road surface condition when the vehicle deceleration is larger than a third predetermined value, and that the road-wheel vibration is caused by the drive-train vibration when the vehicle deceleration is smaller than the third predetermined value. There is a pressure-reduction threshold setting section for setting a pressure-reduction threshold depending on the road-wheel vibration detected and determined by the vibration detecting section and the vibration determining section. The pressure-reduction threshold setting section sets a pressure-reduction threshold value at a lower value, as compared to a normal road surface condition, when the bad road surface condition is determined by the vibration determining section, and the pressure-reduction threshold setting section sets the pressure-reduction threshold value at a higher value, as compared to the normal road surface condition, when the drive-train vibration is determined by the vibration determining section. Finally, there is a skid control section for preventing a skid of each of the road wheels by regulating each wheel-brake cylinder pressure. The skid control section executes a pressure build-up procedure, a pressure-reduction procedure, and a pressure-hold procedure depending on the pressure-reduction threshold set by the pressure-reduction threshold setting section.

According to still further aspect of the invention, an anti-skid braking system comprises wheel-speed sensors for detecting the wheel speed of each of the road wheels, and a hydraulic brake unit for regulating wheel-brake cylinder pressure of wheel-brake cylinders mounted to each of the road wheels. The hydraulic brake unit is capable of forming a pressure build-up mode, a pressure-reduction mode, and a pressure-hold mode of each of the wheel-brake cylinders. There also is a control unit that is configured to be electrically connected to the wheel-speed sensors for processing a wheel-speed data signal detected from each of the wheel-speed sensors. The control unit comprises a wheel acceleration calculating section for calculating a wheel acceleration and a wheel deceleration of each of the road wheels based on the wheel-speed data signal, a wheel acceleration cycle calculating section for calculating a wheel acceleration cycle of each of the road wheels, a vehicle deceleration calculating section for calculating a vehicle deceleration, and a vibration detecting section for detecting a road-wheel vibration of the road wheel based on the wheel acceleration and the wheel acceleration cycle. The vibration detecting section detects the road-wheel vibration when the wheel acceleration is larger than a first predetermined value, and when the wheel acceleration cycle is smaller than a second predetermined value. There is a vibration determining section for determining whether the road-wheel vibration is caused by a bad road surface condition, or the road-wheel vibration is caused by a drive-train vibration of the automotive vehicle. The vibration determining section determines that the road-wheel vibration is caused by the bad road surface condition when the vehicle deceleration is larger than a third predetermined value, and that the road-wheel vibration is caused by the drive-train vibration when the vehicle deceleration is smaller than the third predetermined value. There also is a pressure-reduction threshold setting section for setting a pressure-reduction threshold depending on the road-wheel vibration detected and determined by the vibration detecting section and the vibration determining section. The pressure-reduction threshold setting section sets a pressure-reduction threshold value at a lower value, as compared to a normal road surface condition, when the bad road surface condition is determined by the vibration determining section, and the pressure-reduction threshold setting section sets the pressure-reduction threshold value at a higher value, as compared to the normal road surface condition, when the drive-train vibration is determined by said vibration determining section. There is a skid control section for preventing a skid of each of the road wheels by regulating each wheel-brake cylinder pressure. The skid control section executes a pressure build-up procedure, a pressure-reduction procedure, and a pressure-hold procedure depending on the pressure-reduction threshold set by the pressure-reduction threshold setting section, and the skid control section prohibits the pressure build-up procedure within a predetermined period, at least right after an initial pressure-reduction procedure is executed, when the drive-train vibration is determined by the vibration determining section. The skid control section comprises a pressure build-up procedure control section for controlling the pressure build-up procedure. The pressure build-up procedure control section executes a gradual pressure build-up procedure after an initial pressure build-up procedure is executed, when said skid control section determines a further pressure build-up procedure is needed. There is a pressure-rising volume changing section for changing a pressure-rising volume depending on the road-wheel vibration detected and determined by the vibration detecting section and the vibration determining section. The pressure-rising volume changing section changes the pressure-rising volume at a higher value as compared to the normal road surface condition when the bad road surface condition is determined by the vibration determining section, and changes the pressure-rising volume at a lower value as compared to the normal road surface condition when the drive-train vibration is determined by said vibration determining section. The pressure-rising volume changing section changes the pressure-rising volume at least when the pressure build-up procedure control section executes the initial pressure build-up procedure. The pressure-rising volume changing section changes a pressure-rising period at a shorter value as compared to a normal pressure-rising period executed in the normal road surface condition when the pressure-rising volume changing section changes the pressure-rising volume at the higher value, and changes the pressure-rising period at a longer value as compared to the normal pressure-rising period when the pressure-rising volume changing section changes the pressure-rising volume at the lower value. Finally, there is a pressure-reduction volume changing section for changing a pressure-reduction volume depending on the road-wheel vibration detected and determined by the vibration detecting section and the vibration determining section. The pressure-reduction volume changing section changes the pressure-reduction volume at a lower value as compared to the normal road surface condition when the bad road surface condition is determined by the vibration determining section.

Other aspects and advantages of the invention will become apparent from the following description, taken in conjunction with the accompanying drawings, illustrating by way of example the principles of the invention.

DETAILED DESCRIPTION OF THE PREFERRED EMBODIMENT

Figure 1:
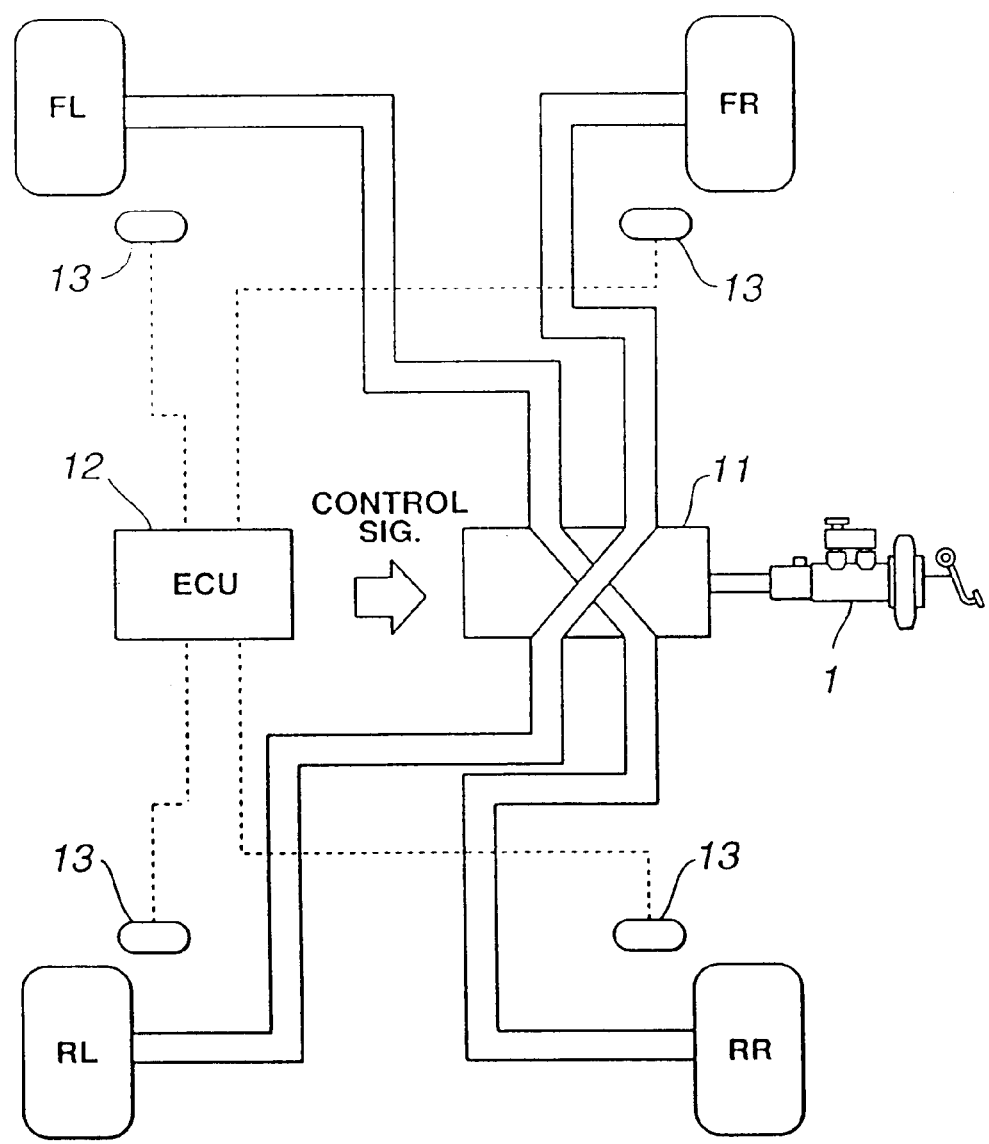
FIG. 1 is a system layout of the anti-skid braking system having a road-wheel vibration determining system of preferred embodiment of the present invention.

An anti-skid braking system (ABS) that has a road-wheel vibration determining system according to preferred embodiments will now be described referring to the drawings.

According to the preferred embodiments of the present invention, the ABS is used with a four-channel ABS diagonal brake-circuit layout.

Figure 2:
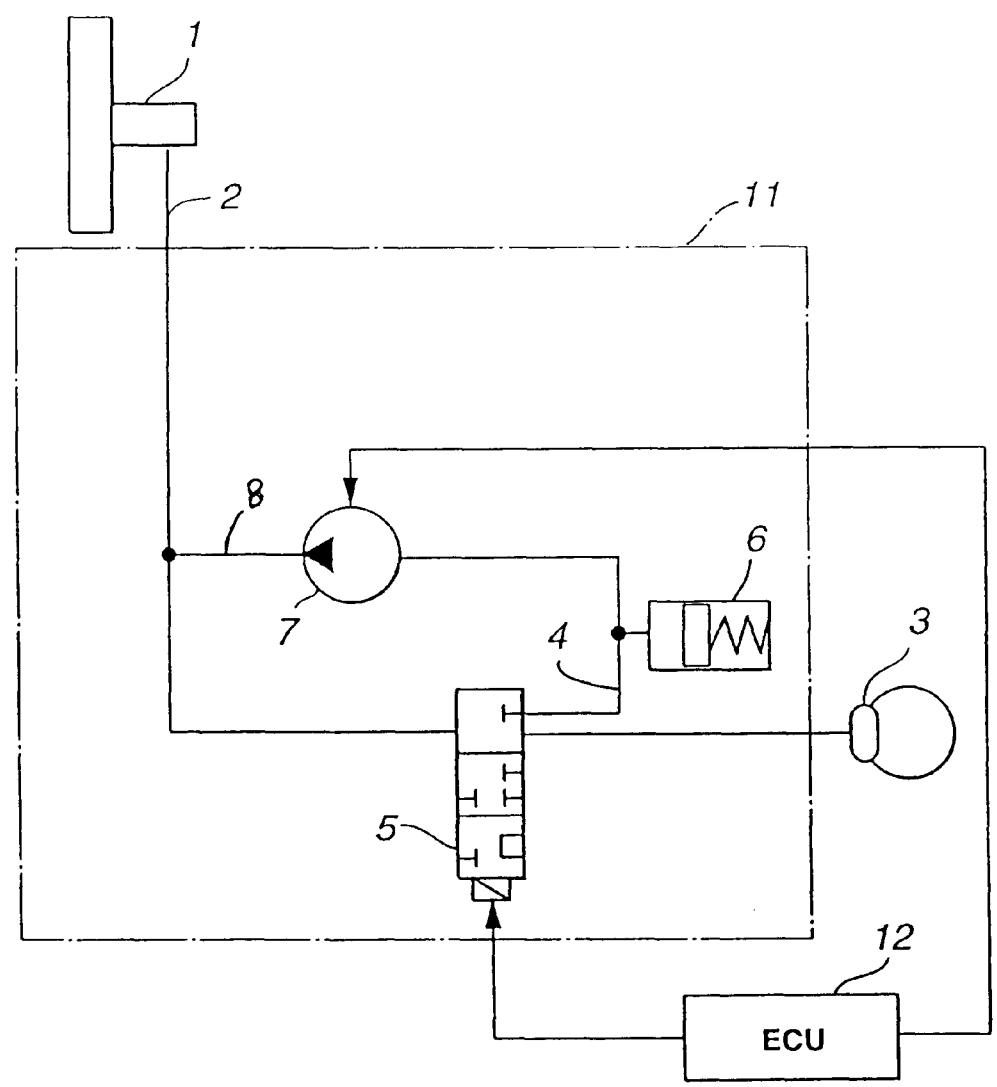
FIG. 2 is a hydraulic system diagram, showing a hydraulic actuator being applicable to the anti-skid braking system of preferred embodiment of the present invention.

In FIG. 2, reference 1 denotes a master cylinder. The master cylinder 1 may be constructed from a typical tandem master cylinder with two pistons in tandem. For the purpose of illustrative simplicity, FIG. 2 merely shows the connection relationship of an ABS closed loop control circuit containing a hydraulic brake control unit (or a hydraulic modulator) 11 with respect to only one of the four wheel-brake cylinders. As the brake pedal (not shown) is depressed, the pistons in the master cylinder 1 apply a pressure to brake fluid. The pressure forces the brake fluid through an outlet port (not shown) of the master cylinder 1 into a hydraulic circuit 2. Then, the pressure is regulated by the hydraulic brake control unit 11 disposed in the hydraulic brake circuit 2, and the regulated pressure is supplied to a wheel-brake cylinder 3. The hydraulic brake control unit 11 comprises a drain circuit 4 and a directional control valve 5. In order to properly regulate or control the brake-fluid pressure to the wheel-brake cylinder 3, the directional control valve 5 is designed to switch among three operating modes, namely a pressure build-up mode where an upstream side (a master cylinder side) of the brake circuit 2 is communicated with a downstream side (a wheel cylinder side) of the brake circuit 2, a pressure-reduction mode where the brake fluid in the wheel-brake cylinder 3 is relieved within toward the drain circuit 4 and a pressure-hold mode where the brake circuit 2 is shut off, and thus, the brake-fluid pressure in the wheel-brake cylinder 3 is held constant. For the purpose of illustrative simplicity, although only one directional control valve 5 is shown in FIG. 2, actually, as can be appreciated from the simplified arrangement of the four-channel ABS diagonal brake-circuit layout shown in FIG. 1, plural directional control valves 5 are provided in the hydraulic brake unit 11 in order to independently regulate the fluid pressure to each individual wheel cylinder. The directional control valve 5 usually comprises an electromagnetic valve. According to the preferred embodiments of the present invention, although one directional control valve 5 is capable of forming the three operating modes, the pressure build-up mode, the pressure-reduction mode, and the pressure-hold mode, these three modes may also be formed by two directional control valves. In this case, the first directional control valve is provided so that the first directional control valve selectively connects and disconnects the hydraulic brake circuit 2, and the second directional control valve is provided so that the second directional control valve selectively connects and disconnects the drain circuit 4. Also, the hydraulic brake control unit 11 has a pressure reservoir 6 provided in each drain circuit 4 and a return pump 7, often called an "ABS pump". The pressure reservoir 6 is designed to temporarily store a surplus brake fluid. A surplus of brake fluid occurs when the brake fluid pressure in the wheel brake cylinder 3 is reduced, that is, during the pressure-reduction mode. The return pump 7 is designed to carry or return the brake fluid flowing from the wheel-brake cylinder 3 via the reservoir 6 into a main circuit of the master cylinder, i.e., the upstream side of the directional control valve 5. With the previously-noted arrangement of the ABS system shown in FIGS. 1 and 2, the brake-fluid pressure to each wheel brake cylinder 3 can be properly regulated or controlled. According to the preferred embodiments of the present invention, the ABS that has the road-wheel vibration determining system is provided on a four-wheel drive vehicle which can be selectively, or automatically, switched between a two-wheel drive (2WD) state and a four-wheel drive (4WD) state. An operation of the directional control valve 5, which is associated with each wheel-brake cylinder 3, in order to switch among valve positions, and an operation of the return pump 7 in order to switch between inoperative and operative states, are electrically controlled by an electric control unit (hereafter, referred to as "ECU") 12. The ECU 12 usually comprises a microcomputer. Although it is not clearly shown in FIG. 3, the ECU 12 includes a central processing unit (CPU) that performs necessary arithmetic-calculations, processes informational data, compares signals from the sensors to preprogrammed threshold values, and makes necessary decisions of acceptance, memories (RAM, ROM), and an input/output interface. Actually, the ECU 12 performs various data processing actions shown in FIGS. 3, 4, 5, 7, 8, 9, 11, 12, 13, and 14, which will be fully described later. The informational data includes a wheel speed data signal detected by four wheel-speed sensors (13, 13, 13, 13). The four wheel-speed sensors 13 placed at the respective road wheels (FL, FR, RL, RR) are provided in order to continuously monitor or detect a rotational speed of each individual wheel, and to relay detected wheel-speed data signals to the input interface of the ECU 12. The memories store preprogrammed or predetermined data, such as various threshold values, and temporarily store the results of the arithmetic-calculations and the necessary decisions made by the CPU. The output interface of the ECU 12 is configured to be electronically connected to each directional control valve 5 of the hydraulic brake control unit 11 in order to produce a control command signal to the directional control valve 5, which is associated with each individual wheel-brake cylinder 3, as well as the return pump 7, on the basis of the results of arithmetic-calculations and decisions performed by the CPU.

Figure 3:
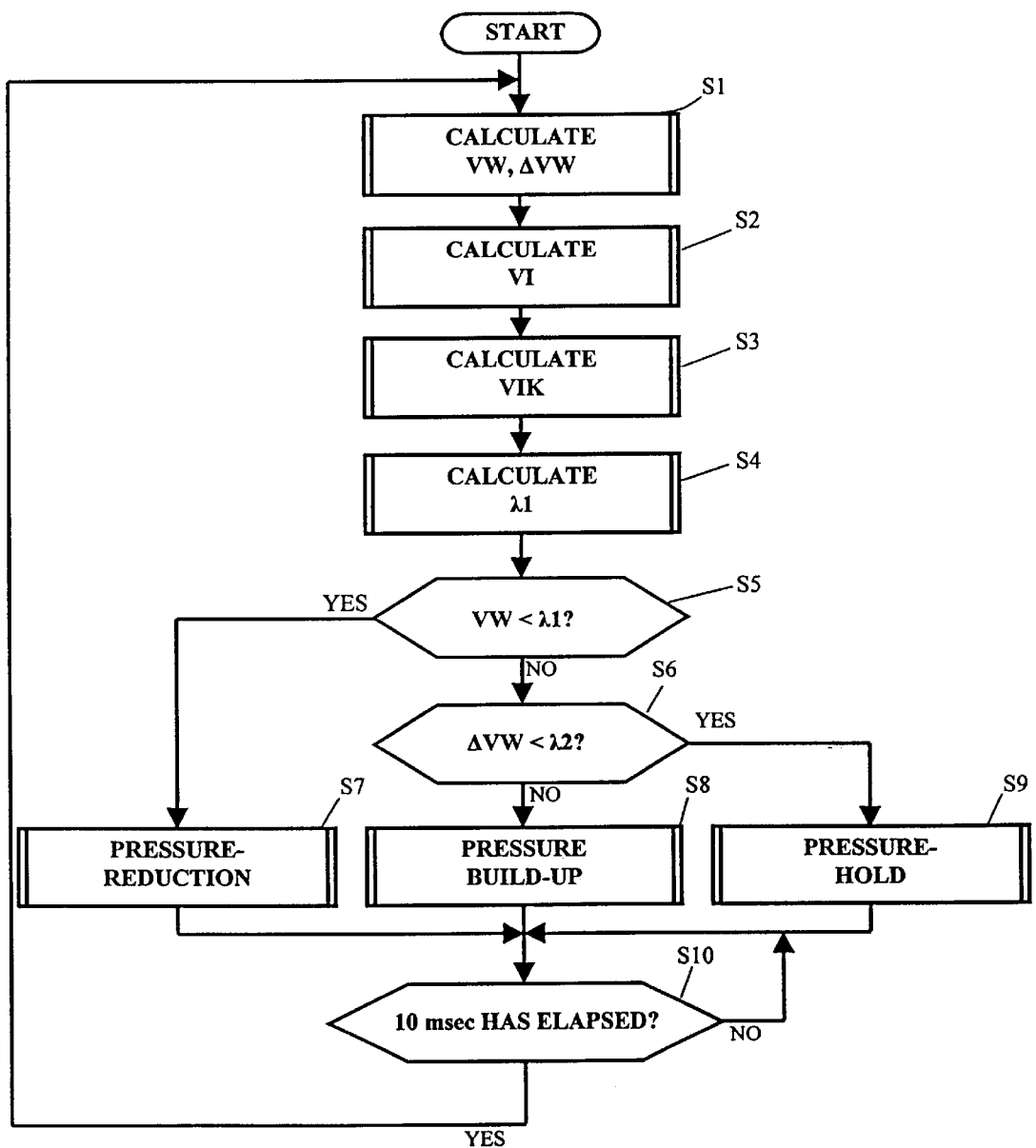
FIG. 3 is a flow chart, showing a main routine of a skid control executed by the anti-skid braking system of a first embodiment of the present invention.

Next, a main routine of a skid-control of a first embodiment of the present invention will be described with a reference to FIG. 3. According to the first embodiment of the present invention, the main routine is executed as time-triggered routines to be triggered in every predetermined time interval, such as 10 milliseconds.

At a step S1, an arithmetic section of the ECU 12 (shown in FIG. 2) calculates a wheel speed VW of each road wheels, front-left wheel speed VWFL, a front-right wheel speed VWFR, a rear-left wheel speed VWRL, and a rear-right wheel speed VWRR. And then, at the same step S1, an acceleration/deceleration rate (simply a wheel acceleration data ΔVW) of each road wheel, a front-left wheel acceleration ΔVWFL, a front-right wheel acceleration ΔVWFR, a rear-left wheel acceleration ΔVWRL, and a rear-right wheel acceleration ΔVWRR is arithmetically calculated, based on the latest up-to-date information, namely the more recent wheel speed indicative data signals, from the four wheel speed sensors 13. At a step S2, a pseudo vehicle speed VI is arithmetically calculated or determined by a predetermined or a preprogrammed arithmetic processing in a conventional manner. At a step S3, a vehicle deceleration VIK is arithmetically calculated or determined by a conventional manner based on a rate of change of the pseudo vehicle speed VI, for example, an expression VIK=VI(n−1)−VI(n), where VI(n−1) denotes a previous value of the pseudo vehicle speed VI, whereas VI(n) denotes a current value (a more recent data) of the pseudo vehicle speed VI. The previous value VI(n−1) corresponds to a pseudo vehicle speed value which is one cycle before in comparison with a current arithmetic-calculation routine for the pseudo vehicle speed VI. At a step S4, a pressure-reduction threshold value λ1, which determines a timing of executing a pressure-reduction procedure, is arithmetically calculated. A manner of calculating the pressure-reduction threshold λ1 will be described later. At a step S5, each wheel speed (VWFL, VWFR, VWRL, VWRR) is compared to the pressure-reduction threshold value λ1 in order to determine whether the respective road wheel speed VW is smaller than the pressure-reduction threshold value λ1. When a determination of the step S5 is in an affirmative (YES), i.e., in case of VW<λ1, a program proceeds to a step S7. Conversely, when the determination of the step S4 is in a negative (NO), i.e., in case of VW≧λ1, a step S6 occurs. In step S6, each wheel acceleration data (ΔVWFL, ΔVWFR, ΔVWRL, ΔVWRR) is compared to a predetermined pressure-hold threshold value λ2 in order to determine whether the respective wheel acceleration data ΔVW is smaller than the pressure-hold threshold value λ2. When the determination of the step S6 is in an affirmative (YES), i.e., in case of ΔVW<λ2, the program proceeds to a step S9. Conversely, when the determination of the step S6 is in a negative (NO), i.e., in case of ΔVW≧λ2, a step S8 occurs. The wheel acceleration data ΔVW of each road wheel is defined as the time rate of change of each the wheel speed (VWFL, VWFR, VWRL, VWRR). Thus, when the inequality ΔVW<λ2 is satisfied at the step S6, the CPU of the ECU 12 determines that the wheel speed VW is almost equal to the pseudo vehicle speed VI, and then, a procedure flows to the step S9 so as to execute a pressure-hold procedure with the directional control valve 5 held at a pressure-holding valve position. In contrast, when the inequality ΔVW<λ2 is unsatisfied at the step S6, the CPU of the ECU 12 determines that the wheel speed VW is returning to the pseudo vehicle speed VI, and thus, the program flows to the step S8 so as to execute a pressure build-up procedure with the directional control valve held at a pressure-increasing valve position. On the other hand, when the inequality VW<λ1 is satisfied at the step S5, the CPU of the ECU determines that a skid starts to develop, and thus, the program flows to the step S7 so as to execute the pressure-reduction procedure with the directional control valve 5 held at a pressure-decreasing valve position. According to the first embodiment of the present invention, the pressure build-up procedure, the pressure-hold procedure, and the pressure-reduction procedure may be executed by the conventional manner. Subsequently to the steps S7, S8 or S9, the program flows to a step S10. At the step S10, a test is made to determine whether a predetermined period, such as 10 msec, has been elapsed from when a current cycle of the skid-control routine has been started. When an answer to the step S10 is in an affirmative (YES), the program returns to the step S1 in order to execute a next cycle following the current cycle. In other words, the main routine of the skid-control shown in FIG. 3 is executed as time-triggered routines to be triggered every predetermined intervals, such as 10 milliseconds.

Figure 4:
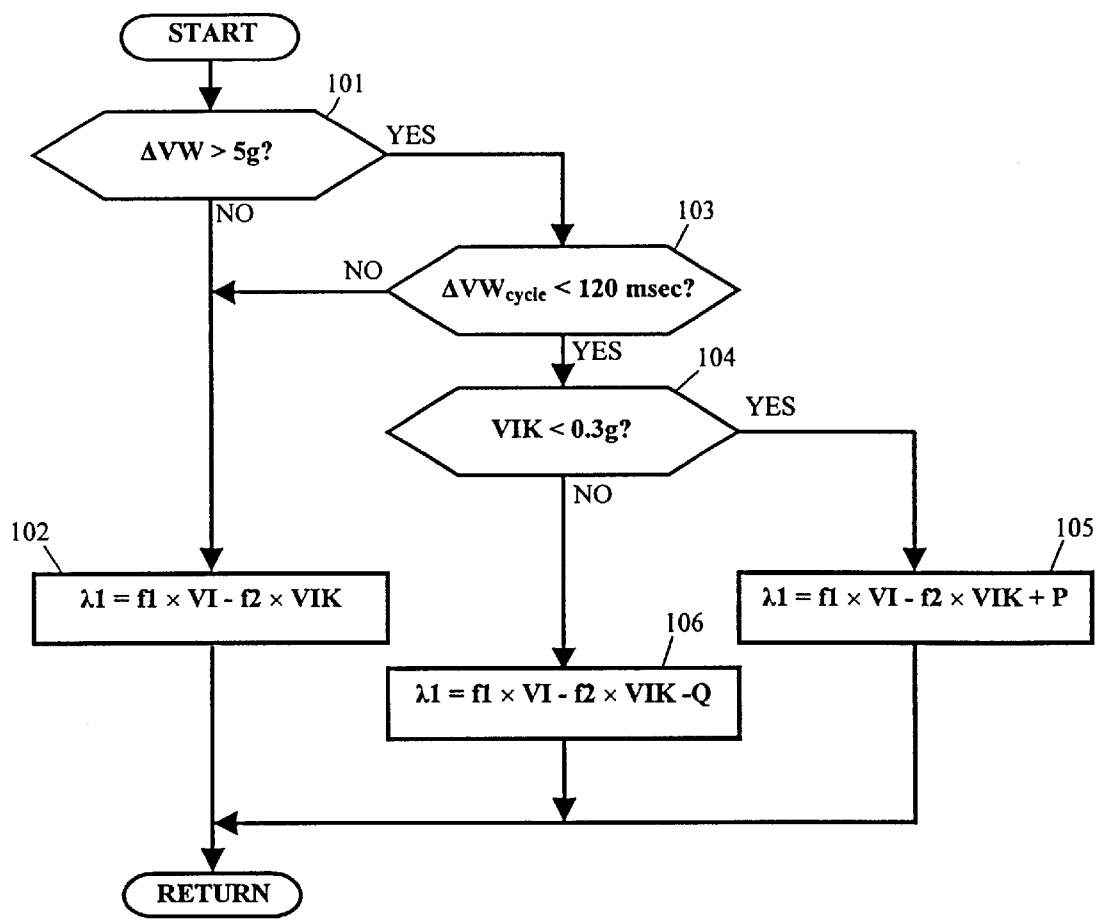
FIG. 4 is a flow chart, showing details of a pressure-reduction threshold setting routine related to the road-wheel vibration determining system of the first embodiment.

Next, details of determining a road-wheel vibration and calculating the pressure-reduction threshold value λ1 at the step S4 according to a first embodiment of the present invention will be described with a reference to FIG. 4. At a step 101, the wheel acceleration data ΔVW, which is arithmetically calculated in the step S1 of FIG. 3, is compared to a predetermined value in order to determine whether the wheel acceleration data ΔVW is larger than the predetermined value, such as 5 g ("g" denotes an acceleration gravity). When a determination of the step 101 is in a negative (NO), i.e., in case of ΔVW≦5 g, the CPU of the ECU determines that a vehicle is traveling in a normal road surface condition, and that the road-wheel vibration has not occurred. Then, the program flows to a step 102 so as to arithmetically calculate the pressure-reduction threshold value λ1 by an expression, λ1=f1×VI−f2×VIK, where f1, VI, f2 and VIK denote a first coefficient, a pseudo vehicle speed calculated in the step S2 of FIG. 3, a second coefficient, and vehicle deceleration calculated in the step S3 of FIG. 4, respectively. On the other hand, when the determination of the step 101 is in an affirmative (YES), i.e., in case of ΔVW>5 g, the program flows to a step 103 so as to execute a second step of determining whether the road-wheel vibration has occurred or not. At the step 103, a wheel acceleration cycle data ΔVWcycle is arithmetically calculated, and then, in the same step 103, the wheel acceleration cycle data ΔVW cycle is compared to a predetermined value in order to determine whether the wheel acceleration data ΔVWcycle is smaller than the predetermined value, such as 120 msec, which corresponds to about 6–7 Hz. When a determination of the step 103 is in a negative (NO), i.e., in case of ΔVW cycle≧120 msec, the CPU of the ECU determines that the road-wheel vibration has not occurred, and then, the program flows to the step 102. Conversely, when the determination of the step 103 is in an affirmative (YES), i.e., in case of ΔVWcycle<120 msec, the CPU of the ECU determines that the road-wheel vibration has occurred, and then, the program flows to a step 104 in order to determine what causes the road-wheel vibration. In the step 104, the vehicle deceleration VIK is compared to a predetermined value in order to determine whether the vehicle deceleration VIK is smaller than the predetermined value, such as 0.3 g. When a determination of the step 104 is in an affirmative (YES), i.e., in case of VIK<0.3 g, the CPU of the ECU determines that the road-wheel vibration is caused by a drive-train vibration, and then, the program flows to a step 105 so as to set the pressure-reduction threshold value λ1 at a higher value as compared to the normal road surface condition. At the step 105, the pressure-reduction threshold value λ1 is arithmetically calculated by an expression, $\lambda 1=f1 \times VI - f2 \times VIK + P$, where P denotes a constant. Thereby, the pressure-reduction threshold value $\lambda 1$ is set at the higher value as compared to the pressure-reduction threshold value $\lambda 1$ calculated in the step 102. Conversely, when the determination of the step 104 is in a negative (NO), i.e., in case of VIK$\geq$0.3 g, the CPU of the ECU determines that the road-wheel vibration is caused by a bad road surface condition, and then, the program flows to a step 106 so as to set the pressure-reduction threshold value $\lambda 1$ at a lower value as compared to the normal road surface condition. At the step 106, the pressure-reduction threshold value $\lambda 1$ is arithmetically calculated by an expression, $\lambda 1=f1 \times VI - f2 \times VIK - Q$, where Q denotes a constant. Thereby, the pressure-reduction threshold value $\lambda 1$ is set at the lower value as compared to the pressure-reduction threshold value $\lambda 1$ calculated in the step 102.

When the vehicle travels in a gravel road or a wavy road, the road-wheel vibration which has a different phase [different] between a front axle and a rear axle of the vehicle sometimes occurs. In other words, if a phase of the rear-left wheel speed VWRL and the rear-right wheel speed VWRR change several time after the time when a phase of the front-left wheel speed VWFL and the front-right wheel speed VWFR have changed, it was difficult to be determined what causes the road-wheel vibration by the conventional manner. According to the first embodiment of the present invention, however, since the road-wheel vibration is detected based on the wheel acceleration data $\Delta VW$ and the wheel acceleration cycle data $\Delta VW$cycle, and determined based on the vehicle deceleration VIK, the road-wheel vibration can be accurately detected and determined, and thus, a method of determining the road-wheel vibration can be improved.

Figure 5:
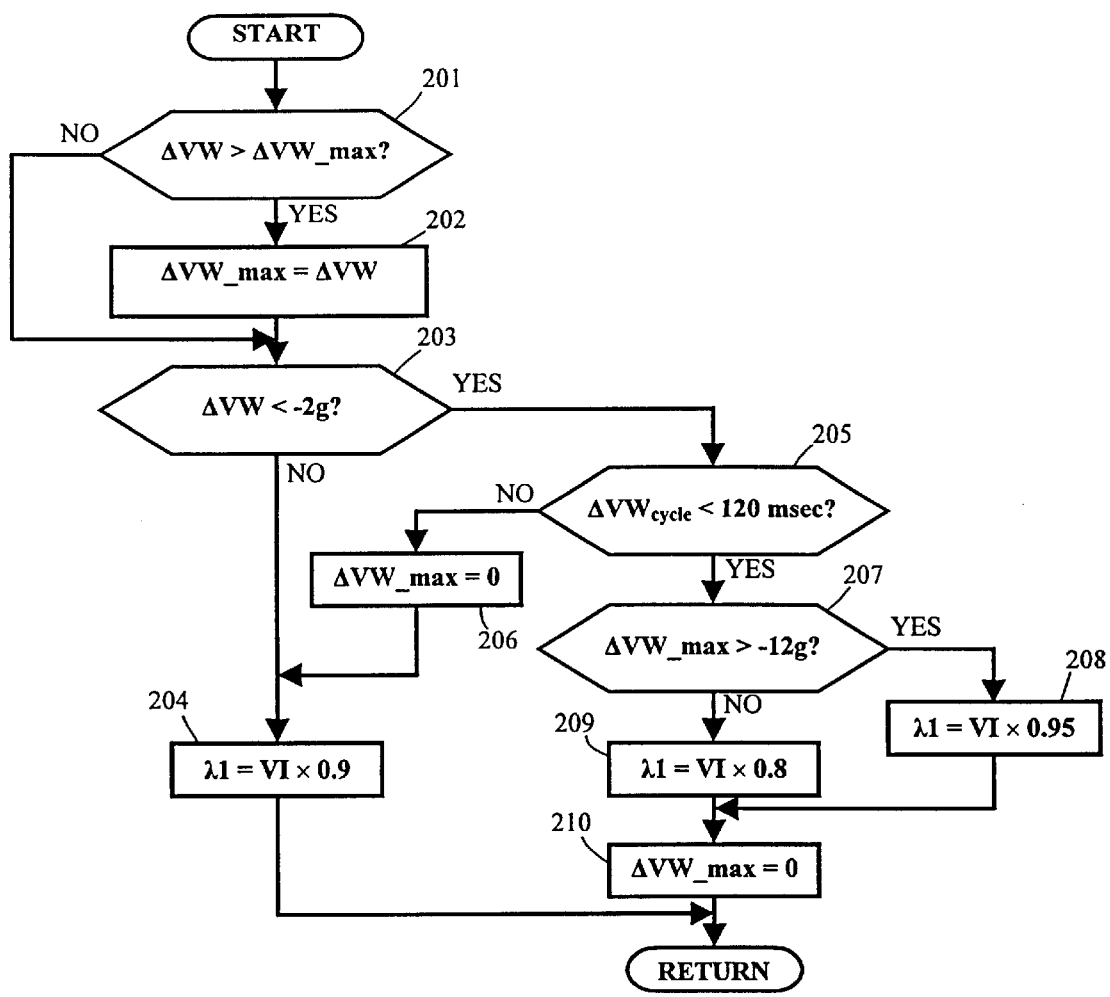
FIG. 5 is a flow chart, showing details of the pressure-reduction threshold setting routine related to the road-wheel vibration determining system of a second embodiment of the present invention.
Figure 6:
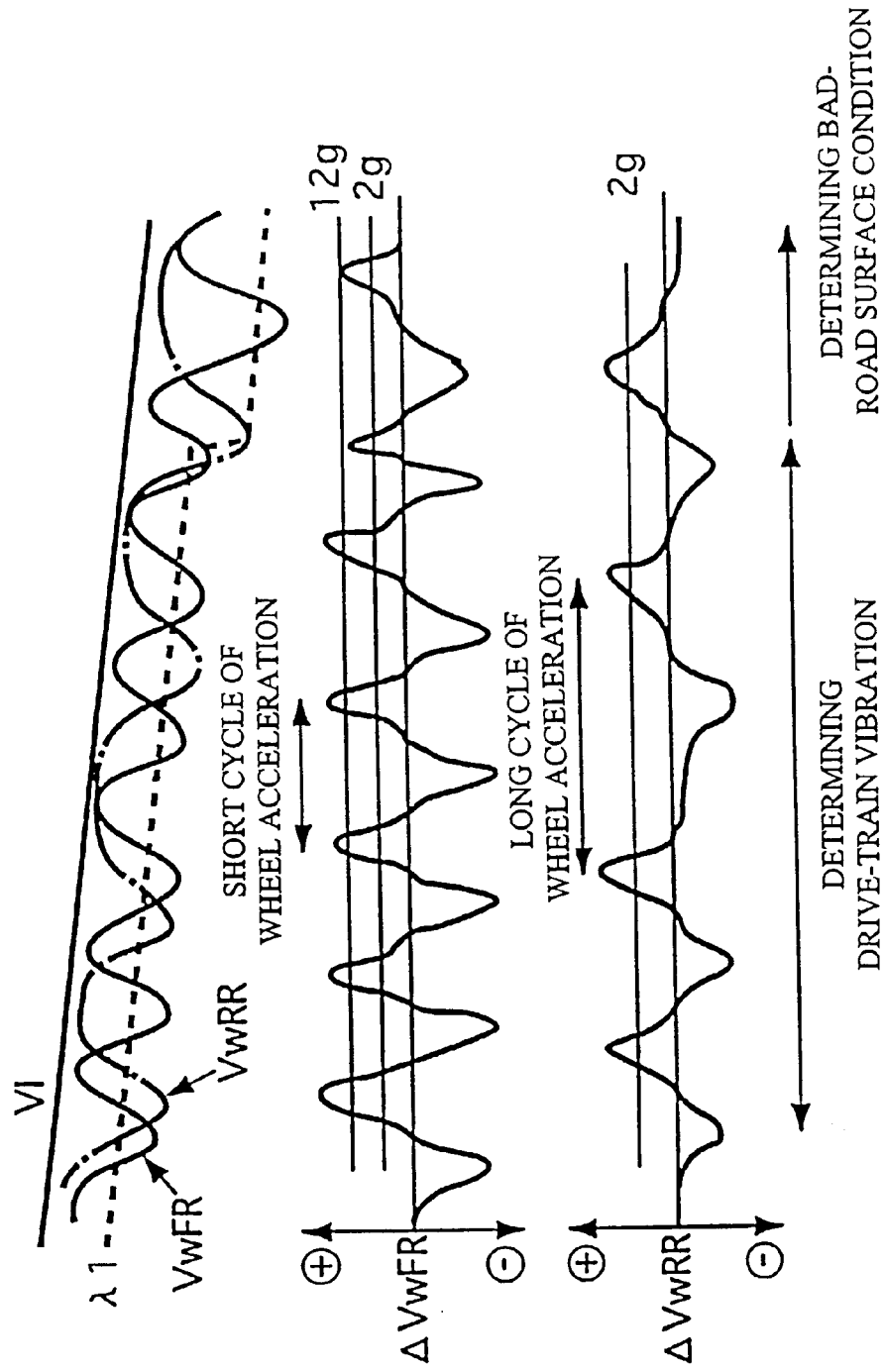
FIG. 6 is a time chart, showing a relationship between a wheel acceleration and a determination of the road-wheel vibration.
Figure 7:
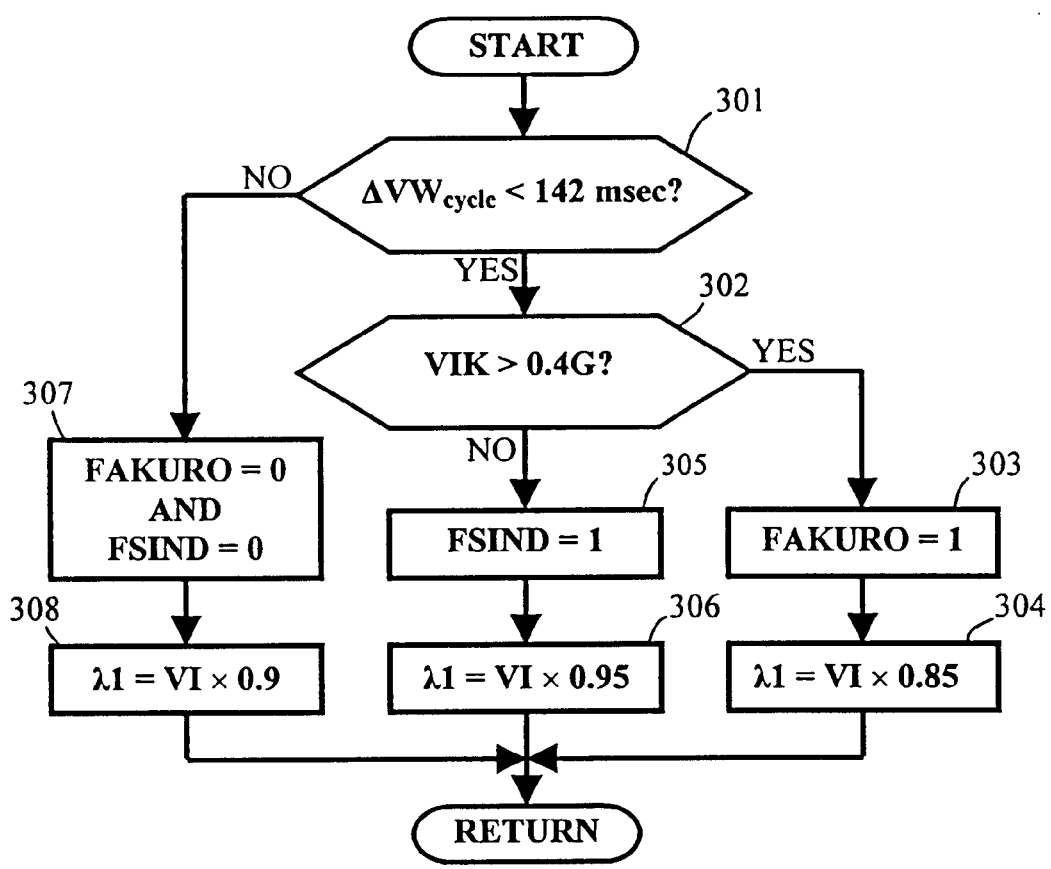
FIG. 7 is a flow chart, showing details of the pressure-reduction setting routine executed by the anti-skid braking system of a third embodiment of the present invention.

Next, the anti-skid braking system that has the road-wheel vibration determining system according to a second embodiment will be described with a reference to FIGS. 5 and 6. The main routine of the skid control is the same as the first embodiment, and thus, the only differences from the first embodiment will be described. In steps 201 and 202, a maximum wheel acceleration data $\Delta VW$_max of the current cycle is arithmetically calculated. That is, the wheel acceleration data $\Delta VW$ is compared to a currently stored maximum wheel acceleration data $\Delta VW$_max at the step 201 in order to determine whether the calculated wheel acceleration value $\Delta VW$ is larger than the currently stored maximum value wheel acceleration data $\Delta VW$_max. When a determination of the step 201 is in an affirmative (YES), i.e., in case of $\Delta VW > \Delta VW$_max, the program proceeds to the step 202 so as to update the maximum wheel acceleration data $\Delta VW$_max. On the other hand, when the determination of the step 201 is in a negative (NO), i.e., in case of $\Delta VW \geq \Delta VW$_max, the program proceeds to a step 203 without updating the maximum value of the wheel acceleration data $\Delta VW$_max. According to the second embodiment of the present invention, the wheel acceleration data $\Delta VW$ is calculated based on a change of the wheel speed VW detected within a recent predetermined period, such as 30 msec. At the step 203, which is a first step of detecting the road-wheel vibration, the wheel acceleration data $\Delta VW$ is compared to a predetermined value in order to determine whether the wheel acceleration data $\Delta VW$ is smaller than the predetermined value, such as –2 g ("g" denotes an acceleration gravity). When a determination of the step 203 is in a negative (NO), i.e., in case of $\Delta VW \geq -2$ g, the program flows to a step 204 so as to arithmetically calculate the pressure-reduction threshold value $\lambda 1$ by an expression, $\lambda 1=VI \times 0.9$. According to the second embodiment of the present invention, as a first step of detecting the road-wheel vibration, the road-wheel vibration is detected when the wheel acceleration data $\Delta VW$ is smaller than –2 g.

Thus, when an inequality $\Delta VW < -2$ g is unsatisfied in the step 203, the CPU of the ECU determines that the road-wheel vibration has not occurred, and thus, the program flows to the step 204 so as to set the pressure-reduction threshold value $\lambda 1$ at a normal value, which is set in the normal road surface condition. On the other hand, when the determination of the step 203 is in an affirmative (YES), i.e., in case of $\Delta VW < -2$ g, the program flows to a step 205 so as to execute a second step of detecting the road-wheel vibration. At the step 105, the wheel acceleration cycle data $\Delta VW$cycle is arithmetically calculated, and then, in the same step 205, the calculated wheel acceleration cycle data $\Delta VW$cycle is compared to a predetermined value in order to determine whether the wheel acceleration data $\Delta VW$cycle is smaller than the predetermined value, such as 120 msec. When a determination of the step 205 is in a negative (NO), i.e., in case of $\Delta VW$cycle$\geq$120 msec, the CPU of the ECU determines that the road-wheel vibration has not occurred, and then, the program flows to a step 206. At the step 206, the maximum wheel acceleration data $\Delta VW$_max is temporarily set at "0", and then, the program flows the step 204. On the other hand, when the determination of the step 205 is in an affirmative (YES), i.e., in case of $\Delta VW$cycle<120 msec, the program flows to a step 207. Therefore, when the inequality $\Delta VW$cycle<120 msec is satisfied in the step 205, the CPU of the ECU determines that the road-wheel vibration has occurred. Then, the program flows to the step 207 so as to determine what causes the road-wheel vibration. In the step 207, the maximum wheel acceleration data $\Delta VW$_max is compared to a predetermined value in order to determine whether the maximum acceleration data $\Delta VW$_max is larger than the predetermined value, such as –12 g. When a determination of the step 207 is in an affirmative (YES), i.e., in case of $\Delta VW$_max>–12 g, the program flows to a step 208 so as to arithmetically calculate the pressure-reduction threshold value $\lambda 1$ by an expression, $\lambda 1=VI \times 0.95$, and when the determination of the step 207 is in a negative (NO), i.e., in case of $\Delta VW$_max$\leq$–12 g, the program flows to a step 209 so as to arithmetically calculate the pressure-reduction threshold value $\lambda 1$ by an expression, $\lambda 1=VI \times 0.8$. Thus, when the inequality $\Delta VW$_max>–12 g is satisfied in the step 207, the CPU of the ECU determines that the road-wheel vibration is caused by the drive-train vibration. Then, the program flows to the step 208 so as to set the pressure-reduction threshold value $\lambda 1$ at a higher value as compared to the normal road surface condition. On the other hand, when the inequality $\Delta VW$_max>–12 g is unsatisfied in the step 207, the CPU of the ECU determines that the road-wheel vibration is caused by the bad road surface condition. Then, the program flows to the step 209 so as to set the pressure-reduction threshold value $\lambda 1$ at a lower value as compared to the normal road surface condition. Subsequently to the steps 207 or 209, the program flows to a step 210. At the step 210, the maximum wheel acceleration data $\Delta VW$_max is temporarily set at "0". Therefore, the maximum wheel acceleration data $\Delta VW$_max is updated in every cycle by the steps 206 or 210. According to the second embodiment of the present invention, the pressure-reduction threshold value $\lambda 1$ is set at the lower value as compared to the normal road surface condition when the bad road surface condition is determined, and the pressure-reduction threshold value $\lambda 1$ is set at the higher value as compared to the normal road surface condition when the drive-train vibration is determined.

A frequency of the wheel acceleration data ΔVW becomes a high-frequency of about 7 Hz when the road-wheel vibration, which is caused by either the bad road surface condition or the drive-train vibration, has occurred, and the maximum wheel acceleration data ΔVW_max becomes up to about −12 g in the bad road surface condition, whereas the maximum wheel acceleration data ΔVW_max becomes, although it depends on specification of a car, −13 g to −17 g in the condition of the drive-train vibration. Thus, the bad road surface condition and the drive-train vibration can be determined based on the wheel acceleration cycle data ΔVWcycle and the maximum wheel acceleration data ΔVW_max. That is, the CPU of the ECU determines that the road-wheel vibration has occurred when the wheel speed VW suddenly drops, i.e., the wheel acceleration data ΔVW is smaller than −2 g, and when the wheel acceleration cycle data ΔVWcycle is smaller than 120 msec. And the CPU of the ECU determines that the road-wheel vibration is caused by the drive-train vibration when the maximum wheel acceleration data ΔVW_max is larger than −12 g, and that the road-wheel vibration is caused by the bad road surface condition when the maximum wheel acceleration data is equal or smaller than −12 g. Therefore, according to the second embodiment of the present invention, as shown in FIG. 6, since the maximum wheel acceleration data ΔVW_max exceeds −12 g in the condition of the drive-train vibration, while the maximum wheel acceleration data ΔVW max is smaller than −12 g in the bad road surface condition, a road-wheel vibration caused by the drive-train vibration can be distinguished from a road-wheel vibration caused by the bad road surface condition, even if the vehicle travels in the bad road surface condition after the drive-train vibration has occurred, and if a vibration that has a different frequency between the front axle and the rear axle has occurred. According to the second embodiment of the present invention, although the wheel acceleration data ΔVW is compared to −2 g, which is a negative value, in the step 203, it may also be compared to a positive value, such as 5 g. Further, although the pressure-reduction threshold value λ1 is calculated by the expressions, λ1=VI×0.85, λ1=VI×0.95, and λ1=VI×0.9, it may also be calculated by the same manners as in the steps 106, 105, and 102, of FIG. 4, respectively.

Next, the anti-skid braking system that has the road-wheel vibration determining system according to the third embodiment of the present invention will be described with a reference to FIGS. 7 through 10. The main routine of the skid control is the same as the first embodiment, and thus, the only differences from the first embodiment will be described. FIG. 6 shows details of determining the road-wheel vibration and calculating the pressure-reduction threshold value λ1. According to the third embodiment of the present invention, the road-wheel vibration is determined based on the vehicle deceleration VIK. In a step 301, the wheel acceleration cycle data ΔVWcycle is arithmetically calculated. And then, at the same step 301, the calculated wheel acceleration cycle data ΔVWcycle is compared to a predetermined value in order to determine whether the road wheel acceleration cycle data ΔVWcycle is smaller than the predetermined value, such as 142 msec, which corresponds to about 6–7 Hz. When a determination of the step 301 is in an affirmative (YES), i.e., in case of ΔVWcycle<142 msec, the program flows to a step 302, and when the determination of the step 301 is in a negative (NO), i.e., in case of ΔVWcycle≧142 msec, the program flows to a step 307. Thus, when the inequality ΔVWcycle<142 msec is satisfied in the step 301, the CPU of the ECU determines that the road-wheel vibration has occurred, and thus, the program flows to the step 302 so as to determine what causes the road-wheel vibration. At the step 302, the vehicle deceleration VIK is compared to a predetermined value in order to determine whether the vehicle deceleration VIK is larger than the predetermined value, such as 0.4 g. When a determination of the step 302 is in an affirmative (YES), i.e., in case of VIK>0.4 g, the CPU of the ECU determines that road-wheel vibration is caused by the bad road surface condition, and the program flows to a step 303 so as to set a bad road decision flag FAKURO at "1". Subsequently to the step 303, the pressure-reduction threshold value λ1 is arithmetically calculated by an expression, λ1=VI×0.85, in a step 304. When the determination of the step 302 is in a negative (NO), i.e., in case of VIK≦0.4 g, the CPU of the ECU determines that the road-wheel vibration is caused by the drive-train vibration, and the program flows to a step 305 so as to set a drive-train decision flag FSIND at "1". Subsequently to the step 305, the pressure-reduction threshold value λ1 is arithmetically calculated by an expression, λ1=VI×0.95, in a step 306. On the other hand, when the inequality ΔVWcycle<142 msec is unsatisfied in the step 301, the CPU of the ECU determines that the road-wheel vibration has not occurred, and the program flows to a step 307 so as to reset or clear the bad road decision flag FAKURO and the drive-train decision flag FSIND to "0". Subsequently to the step 307, the pressure-reduction threshold value λ1 is arithmetically calculated by an expression, λ1=VI×0.9, in a step 308. After these steps 304, 306 and 308, previous data of the bad road decision flag FAKURO, the drive-train decision flag FSIND and the pressure-reduction threshold value λ1 are updated to a current data.

As detailed above, according to the third embodiment of the present invention, the pressure-reduction threshold value λ1 is set at the lower value as compared to the normal road surface condition when the bad road surface condition is determined, and the pressure-reduction threshold value λ1 is set at the higher value as compared to the normal road surface condition when the drive-train vibration is determined. As to determining the road-wheel vibration, the road-wheel vibration is detected when the wheel acceleration cycle data ΔVWcycle is smaller than 142 msec, and then, the road-wheel vibration is determined that the road-wheel vibration is caused by the bad road surface condition when the vehicle deceleration VIK is larger than 0.4 g, and that the road-wheel vibration is caused by the drive-train vibration when the vehicle deceleration VIK is smaller than 0.4 g. As described previously, the frequency of the wheel acceleration data ΔVW becomes the high-frequency of about 7 Hz when the road-wheel vibration has occurred, that is, when the vehicle is traveling in the bad road surface condition, or in the condition of the drive-train vibration. And the vehicle deceleration VIK becomes more than 0.4 g in the bad road surface condition, whereas the vehicle deceleration VIK becomes, although it depends on specification of a car, up to 0.4 g in the condition of the drive-train vibration. Thereby, the bad road surface condition and the drive-train vibration can be determined based on the wheel acceleration cycle data ΔVWcycle and the vehicle deceleration VIK. According to the third embodiment of the present invention, although the wheel acceleration cycle data ΔVWcycle and the vehicle deceleration VIK are compared to 142 msec and 0.4 g, respectively, in order to determine whether the road-wheel vibration has occurred or not, and what causes the road-wheel vibration, the wheel acceleration cycle data ΔVWcycle and the vehicle deceleration VIK may also be compared to a different value, such as 120 msec and 0.3 g, which are used in the first embodiment of the present invention, respectively. Furthermore, although the pressure-reduction threshold value λ1 is calculated by the expressions, λ1=VI×0.85, λ1=VI×0.95, and λ1=VI×0.9, it may also be calculated by the same manners as in the steps 106, 105, and 102, of FIG. 4, respectively.

Figure 8:
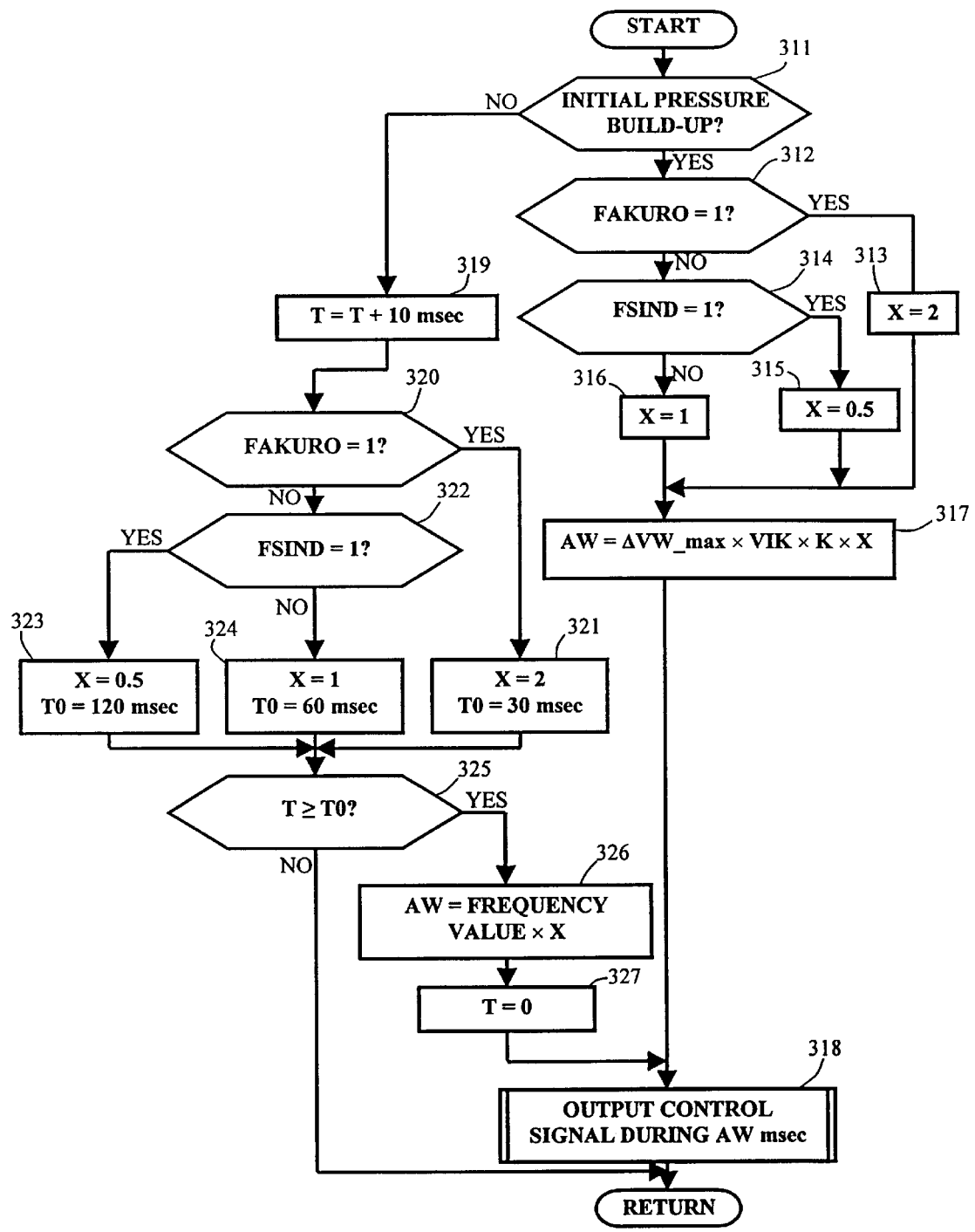
FIG. 8 is a flow chart, showing details of a routine of executing a pressure build-up procedure of the third embodiment of the present invention.
Figure 10:
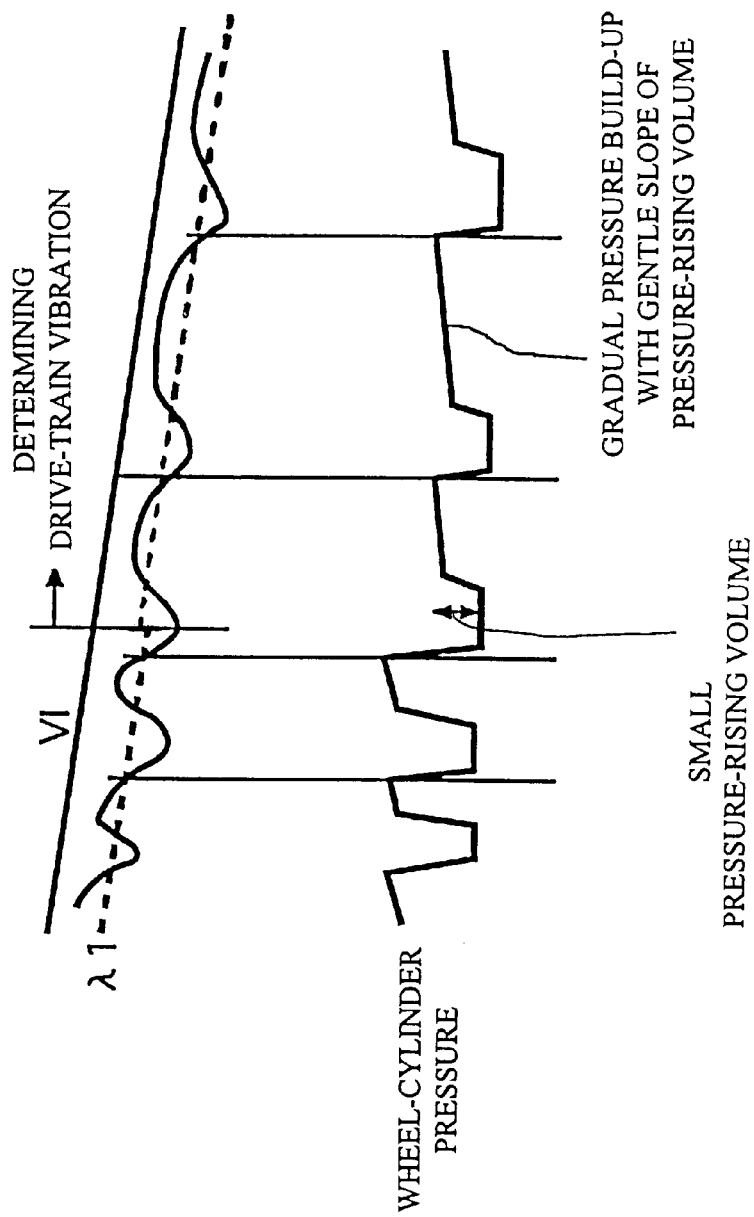
FIGS. 10(a) and 10(b) is a time chart, showing a control characteristic of a vehicle executed by the anti-skid braking system of the third embodiment.

Next, details of executing the pressure build-up procedure in the step S8 of FIG. 3 according to the third embodiment of the present invention will be described with a reference to FIGS. 8 and 10. At a step 311 a test is made to determine whether a current routine of the pressure build-up procedure is an initial pressure build-up procedure after the pressure-reduction procedure has been executed. When an answer of the step 311 is in an affirmative (YES), the program flows to a step 312. In steps 312 and 314, tests are made to determine whether the road-wheel vibration has occurred, and what causes the road-wheel vibration. In the step 312, the bad road decision flag FAKURO is determined whether the bad-road decision flag is "1". When an answer of the step 312 is in an affirmative (YES), i.e., in case of FAKURO=1, the program flows to a step 313 so as to set a constant X at "2". On the other hand, when the answer of the step 312 is in a negative (NO), i.e., in case of FAKURO≠1, the program flows to a step 314 so as to determine whether the drive-train decision flag FSIND is "1". When an answer of the step 314 is in an affirmative (YES), i.e., in case of FSIND=1, the program flows to a step 315 so as to set the constant X at "0.5", whereas the constant X is set at "1" in a step 316 when the answer of the step 314 is in a negative (NO), i.e., in case of FSIND≠1. That is, the constant X is set at "1" in the normal road surface condition, "2" in the bad road surface condition, and "0.5" in the condition of the drive-train vibration. Subsequently to the steps 313, 315 or 316, the program flows to a step 317 so as to arithmetically calculate a valve-opening time AW of the directional control valve 5 (shown in FIG. 2) to hold the directional control valve 5 at the pressure-increasing position. In the step 317, the valve-opening time AW is arithmetically calculated by an expression, AW=ΔVW_max×VIK×K×X, where K denotes a coefficient, and then, the program flows to a step 318. At the step 318, the CPU of the ECU outputs a control signal to the directional control valve 5 depending on the calculated valve-opening time AW in order to execute the pressure build-up procedure with the directional control valve held at a pressure-increasing valve position. Thus, although the initial pressure build-up procedure is executed in all conditions, since the constant X is set differently in each condition, the valve-opening time AW is varied in each condition. Therefore, the initial pressure build-up procedure is executed rapidly in the bad road surface condition as compared to the normal road surface condition, and the initial pressure build-up procedure is executed mildly in the condition of the drive-train vibration as compared to the normal road surface condition.

While the initial pressure build-up procedure is executed at the first routine of the pressure build-up procedure, a gradual pressure build-up procedure is executed after the initial pressure build-up procedure has been executed. When the answer of the step 311 is in a negative (NO), the program flows to a step 319 so as to add a value to a timer value T. In the step 319, the timer value T is added by an expression, T=T+10 msec, where 10 msec denotes a time executing one procedure of the main routine of skid control, and then, the program flows to a step 320. In the step 320, a test is made to determine whether the bad road decision flag is "1". When an answer of the step 320 is in an affirmative (YES), i.e., in case of FAKURO=1, the program flows to a step 321 so as to set the constant X and a timer-setting value T0 at "2" and "30 msec", respectively. Conversely, when the answer of the step 320 is in a negative (NO), i.e., in case of FAKURO≠1, the program flows to a step 322 so as to determine whether the drive-train decision flag FSIND is "1". When a determination of the step 322 is in an affirmative (YES), i.e., in case of FSIND=1, the program flows to a step 323 so as to set the constant X and the timer-setting value T0 at "0.5" and "120 msec", respectively, and when the determination of the step 322 is in a negative (NO), i.e., in case of FSIND≠1, a step 324 occurs. In the step 324, the constant X and the timer-setting value T0 are set at "1" and "60 msec", respectively. Thus, the constant X and the timer-setting value T0 are set at "2" and "30 msec" in the bad road surface condition, "0.5" and "120 msec" in the condition of the drive-train vibration, and "1" and "60 msec" in the normal road surface condition, respectively. After executing the steps 321, 323 or 324, the program flows to a step 325. In the step 325, the timer value T is compared to the timer-setting value T0 to determine whether the timer T is equal or more than the timer-setting value T0. When a determination of the step 325 is in an affirmative (YES), i.e., in case of T≧T0, the program flows to a step 326, whereas the program finishes the current routine of executing the pressure build-up procedure when the determination of the step 325 is in a negative (NO), i.e., in case of T<T0. At the step 326, the valve-opening time AW is arithmetically calculated by an expression, AW=FV×X, where FV denotes a frequency-value referred from a frequency table stored in the RAM/ROM. After this, at a step 327, the timer value T is cleared or reset to "0", and the program flows to the step 318. According to the third embodiment of the present invention, the frequency-value FV is depending on a frequency of the pressure build-up procedure, for example, FV=3 msec (an initial gradual pressure build-up procedure), FV=3 msec (a second gradual pressure build-up procedure), FV=4 msec (a third gradual pressure build-up procedure), and FV=5 msec (a fourth gradual pressure build-up procedure). That is, the frequency-value FV is set in order to become equal or larger than a frequency value FV of a previous routine of executing the pressure build-up procedure, based on the frequency of the gradual pressure build-up procedure. Thus, although the gradual pressure build-up procedure is executed after the initial pressure build-up procedure has been executed, since the constant X and the timer-setting value T0 is set differently in each condition, the valve opening time AW is varied in each condition. Therefore, the gradual pressure build-up procedure is executed differently so that a pressure-rising slope of the gradual pressure build-up procedure executed in the bad road surface condition becomes greater as compared to the pressure-rising slope of the pressure build-up procedure executed in the normal road surface condition, and that the pressure-rising slope of the gradual pressure build-up procedure executed in the condition of drive-train vibration becomes smaller as compared to the pressure-rising slope of the pressure build-up procedure executed in the normal road surface condition. In other words, when the bad road surface condition is determined, the CPU of the ECU executes the gradual pressure build-up procedure so that a large volume of the brake fluid is supplied to the wheel-brake cylinder in a short period as compared to the normal road surface condition, and when the drive-train vibration is determined, the CPU of the ECU executes the gradual pressure build-up procedure so that a small volume of the brake fluid is supplied to the wheel brake cylinder in a long period as compared to the normal road surface condition.

As described above, at the initial pressure build-up proceeding, the valve-opening time AW is set at two times of the valve-opening time AW of the normal road surface condition and the initial pressure build-up procedure is rapidly executed in the bad road surface condition, and the valve-opening time AW is set at a half time of the valve-opening time AW of the normal road surface condition and the initial pressure build-up procedure is mildly executed in the condition of the drive-train vibration. The valve-opening time AW is a valve opening time per unit of time. Therefore, when the valve-opening time AW is set at a large value, the pressure build-up procedure is executed rapidly, and thus, a pressure-increasing volume becomes large. On the other hand, when the valve-opening time AW is set at a small value, the pressure build-up procedure is mildly executed, and thus, a pressure-increasing volume becomes small. After the initial pressure build-up procedure has been executed, the pressure build-up procedure is mildly executed, that is, the gradual pressure build-up procedure is executed after the initial pressure build-up procedure has been executed. In the bad rod surface condition, a pressure-rising period is set so that the valve-opening time AW is longer, and the timer-setting value T0 is shorter, as compared to the normal road surface condition. Thereby, the gradual pressure build-up procedure is executed in a short period, and thus, the pressure-rising slope becomes greater. Conversely, in the condition of the drive-train vibration, the pressure-rising period is set so that the valve-opening time AW is shorter, and the timer-setting value T0 is longer, as compared to the normal road surface condition. Thereby, the gradual pressure build-up procedure is executed in a long period, and thus, the pressure-rising slope becomes smaller. As shown in FIG. 10 (a), after a determination of the bad road surface condition, the pressure-reduction threshold value $\lambda 1$ is set at a lower value, and the pressure-rising volume of the initial pressure build-up procedure is set at a large value, and thus, the pressure-rising slope is set greatly, as compared to the normal road surface condition. On the other hand, as shown in (b) of FIG. 10, after a determination of the drive-train vibration, the pressure-reduction threshold $\lambda 1$ is set at a higher value, and the pressure-rising volume of the initial pressure build-up procedure is set at a small value, and thus, the pressure-rising slope is set small, as compared to the normal road surface condition.

As detailed above, the road-wheel vibration can be determined whether the bad road surface condition causes the road-wheel vibration, or the drive-train vibration causes the road-wheel vibration, based on the vehicle deceleration VIK. Specially, the drive-train vibration can be accurately determined when the vehicle is traveling in a low-$\mu$ road surface condition. Although a gravel road and a wavy road were difficult to be determined as the bad road surface condition by the conventional manner, since the road-wheel vibration is determined based on the vehicle deceleration VIK, they can be accurately determined by the third embodiment of the present invention. Therefore, the method of determining the road-wheel vibration can be improved. Furthermore, according to the third embodiment of the present invention, when the bad road surface condition is determined, since not only the pressure-reduction threshold value $\lambda 1$ is set at the lower value but also the pressure build-up procedure is rapidly executed, the maximum effective braking can be provided, and therefore, the minimum braking distance can be provided. And, when the drive-train vibration is determined, since not only the pressure-reduction threshold value $\lambda 1$ is set at the higher value but also the pressure build-up procedure is mildly executed, the tendency of the road wheel to be locked due to an extreme pressure build-up procedure and the hunting of the execution of the skid control that would encourage the drive train oscillation can be avoided.

Figure 9:
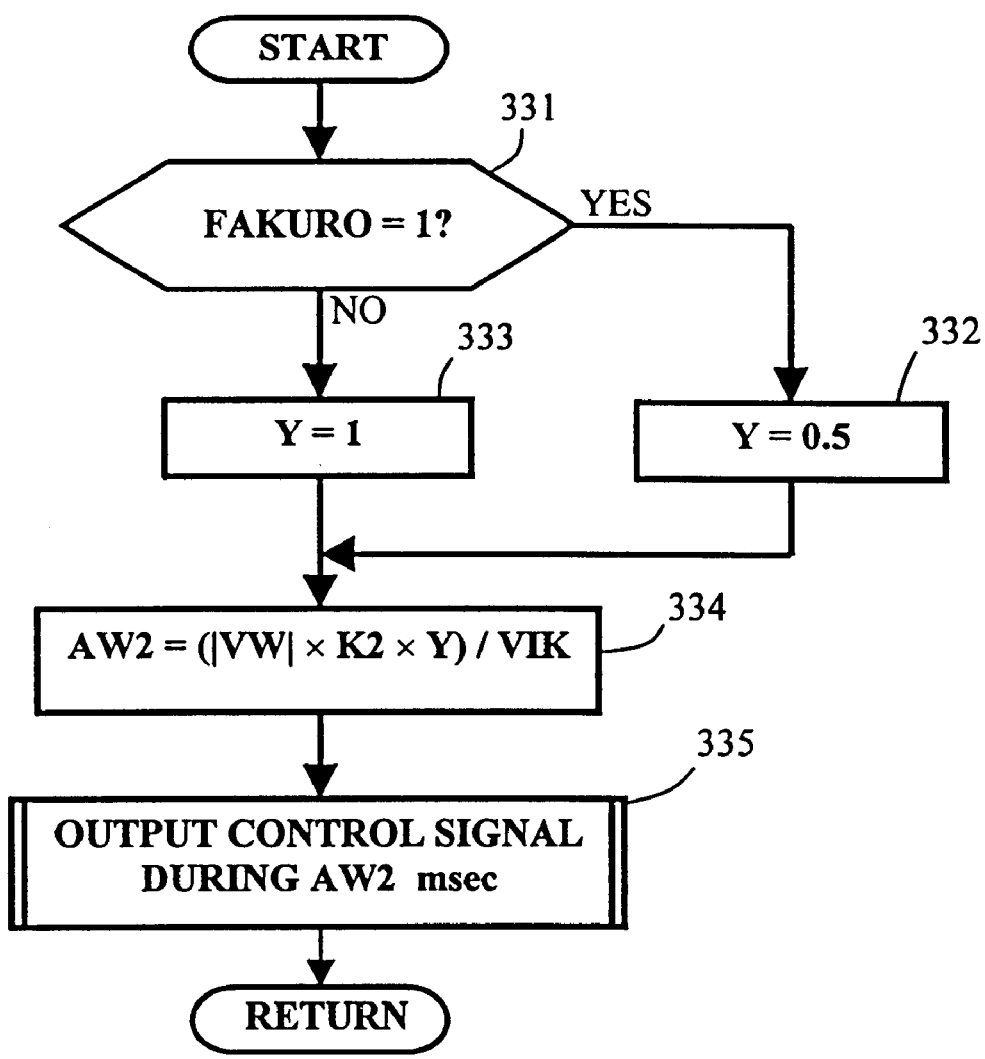
FIG. 9 is a flow chart, showing details of a routine of executing pressure-reduction procedure of the third embodiment of the present invention.

Next, details of executing the pressure-reduction procedure in the step S7 of FIG. 3 according to the third embodiment of the present invention will be described with a reference to FIG. 9. At a step 331, a test is made to determine whether the bad-road decision flag FAKURO is "1". When an answer of the step 331 is in an affirmative (YES), i.e., in case of FAKURO=1, the program flows to a step 332 so as to set a constant Y at "0.5". On the other hand, when the answer of the step 331 is in a negative (NO), i.e., in case of FAKURO≠1, the program flows to a step 333 so as to set the constant Y at "1". Following to the steps 332 or 333, a step 334 is made. In the step 334, a valve-opening time AW2 is arithmetically calculated by an expression, $(|\Delta VW| \times K2 \times Y)/VIK$, where $|\Delta VW|$ and K2 denote an absolute value of the wheel acceleration data $\Delta VW$ and a coefficient, respectively. After this, at a step 335, the CPU of the ECU outputs a control signal to the directional control valve 5 (shown in FIG. 2) based on the calculated valve-opening time AW2 in order to execute the pressure-reduction procedure with the directional control valve 5 held at a pressure-decreasing valve position.

In the bad road surface condition, a pressure-reduction period is set at a short period as compared the normal road surface condition and the condition of the drive-train vibration, so that a pressure-reduction volume becomes small. Thereby, an extreme pressure-reduction procedure that causes a tendency of the braking distance to be long can be avoided, even if the wheel speed VW falls below the pressure-reduction threshold value $\lambda 1$ due to the road-wheel vibration caused by the bad road surface condition. That is, when the vehicle is traveling in the bad road surface condition, the wheel speed VW falls below the pressure-reduction threshold value $\lambda 1$ due to the road-wheel vibration caused by the bad road surface condition, thereby, an unnecessary pressure-reduction procedure that causes the tendency of the braking distance to be long might be executed. However, according to the third embodiment of the present invention, when the bad road surface condition is determined, since the pressure-reduction period and the pressure-reduction volume is set at a small value, the pressure-reduction volume can be reduced, and therefore, the unnecessary pressure-reduction procedure can be avoided.

Next, the anti-skid braking system that has the road-wheel vibration determining system according to the fourth embodiment of the present invention will be described with a reference to FIG. 11. According to the fourth embodiment of the present invention, details of determining the road-wheel vibration is the same as the first embodiment or the second embodiment. Steps of this embodiment are given the same reference characters to corresponding steps of the first embodiment, and thus, the only differences from the first embodiment will be described.

Figure 11:
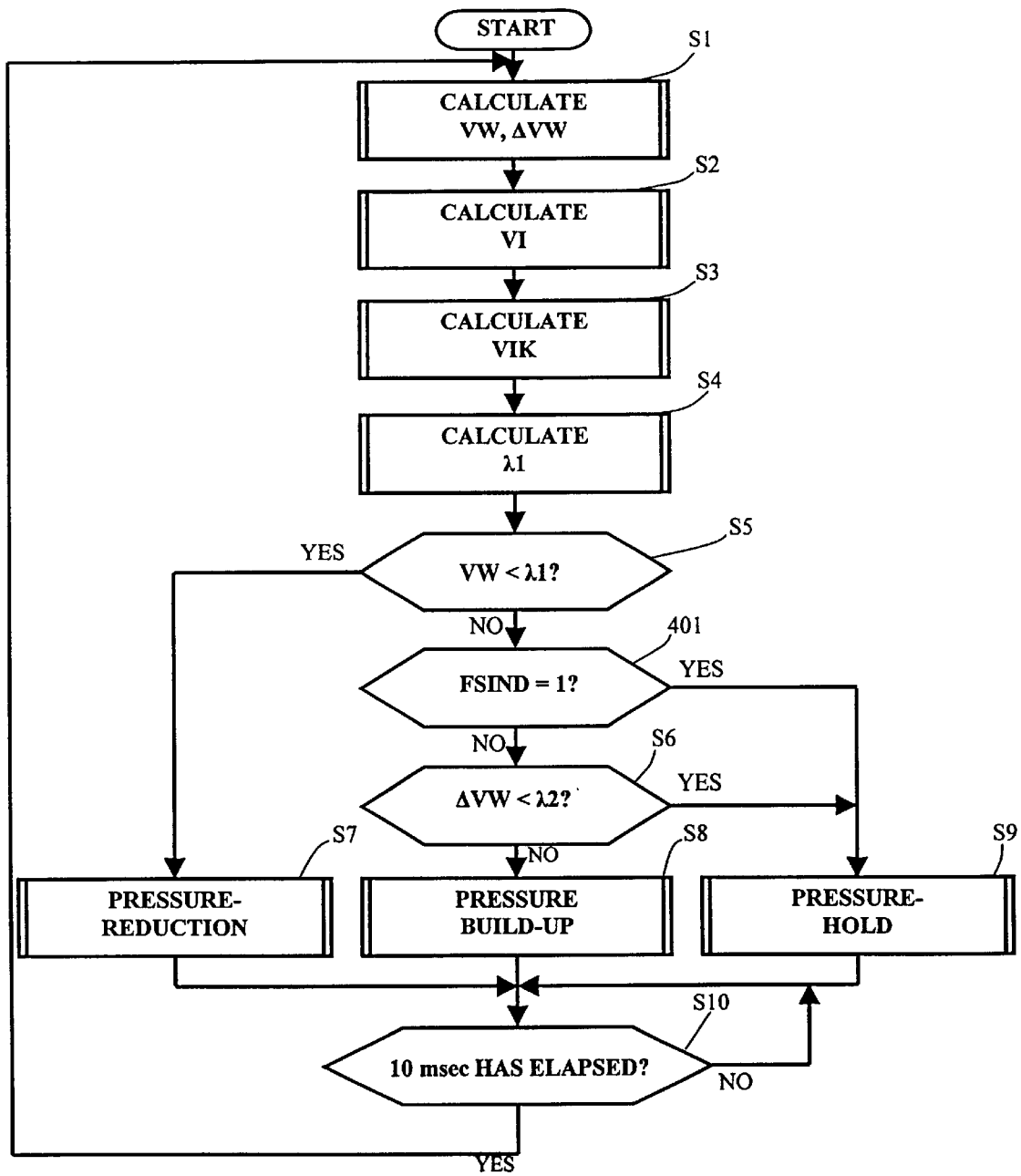
FIG. 11 is a flow chart, showing a main routine of the skid control executed by the anti-skid braking system of a fourth embodiment of the present invention.

FIG. 11 shows a main routine of the skid-control of the fourth embodiment. In a step 401, a test is made subsequently to a negative answer of the step S5. That is, when the answer of the step S5 to a determination of whether the wheel speed VW is smaller than the pressure-reduction threshold value $\lambda 1$ is in a negative (NO), i.e., in case of VW<$\lambda 1$, the program flows to the step 401. In the step 401, the drive-train decision flag FSIND is determined whether the drive-train decision flag is "1". When an answer of the step 401 is in an affirmative (YES), i.e., in case of FSIND=1, the program flows to the step S9 in order to execute the pressure-hold procedure with the directional control valve 5 (shown in FIG. 2) held at a pressure-holding valve position. Therefore, according to the fourth embodiment, the pressure build-up procedure is prohibited when the drive-train vibration is determined. When the wheel speed VW changes up and down caused by the drive-train vibration, a frequent decision of executing the pressure-reduction procedure and the pressure build-up procedure that causes extreme pressure build-up procedure is made. Thereby, the wheel speed VW is easy to fall from an ideal wheel speed, and thus, a strong tendency of the road wheel to be locked is made. Furthermore, if the pressure-reduction procedure and the pressure build-up procedure are executed in compliance with all of the frequently made decisions, the pressure-reduction procedure and the pressure build-up procedure are extremely executed, and thus, the hunting of the execution of the skid-control that would encourage the drive-train vibration might be occurred. However, according to the fourth embodiment of the present invention, since the pressure build-up procedure is prohibited when the drive-train vibration is determined, the tendency of the road wheel to be locked and the hunting of the execution of the skid-control can be avoided. Moreover, since the drive-train decision flag FSIND is reset to "0" after the drive-train vibration is resolved, the pressure build-up procedure is resumed, thereby, the effective braking can be provided. According to the fourth embodiment of the present invention, although the pressure build-up procedure is prohibited when the drive-train vibration is determined, the pressure build-up procedure may be modified so that only the initial pressure build-up procedure is prohibited and the gradual pressure build-up procedure is executed. In this case, only the initial pressure build-up procedure can be prohibited by setting the constant X at "0" in the step 315 of FIG. 8.

Figure 12:
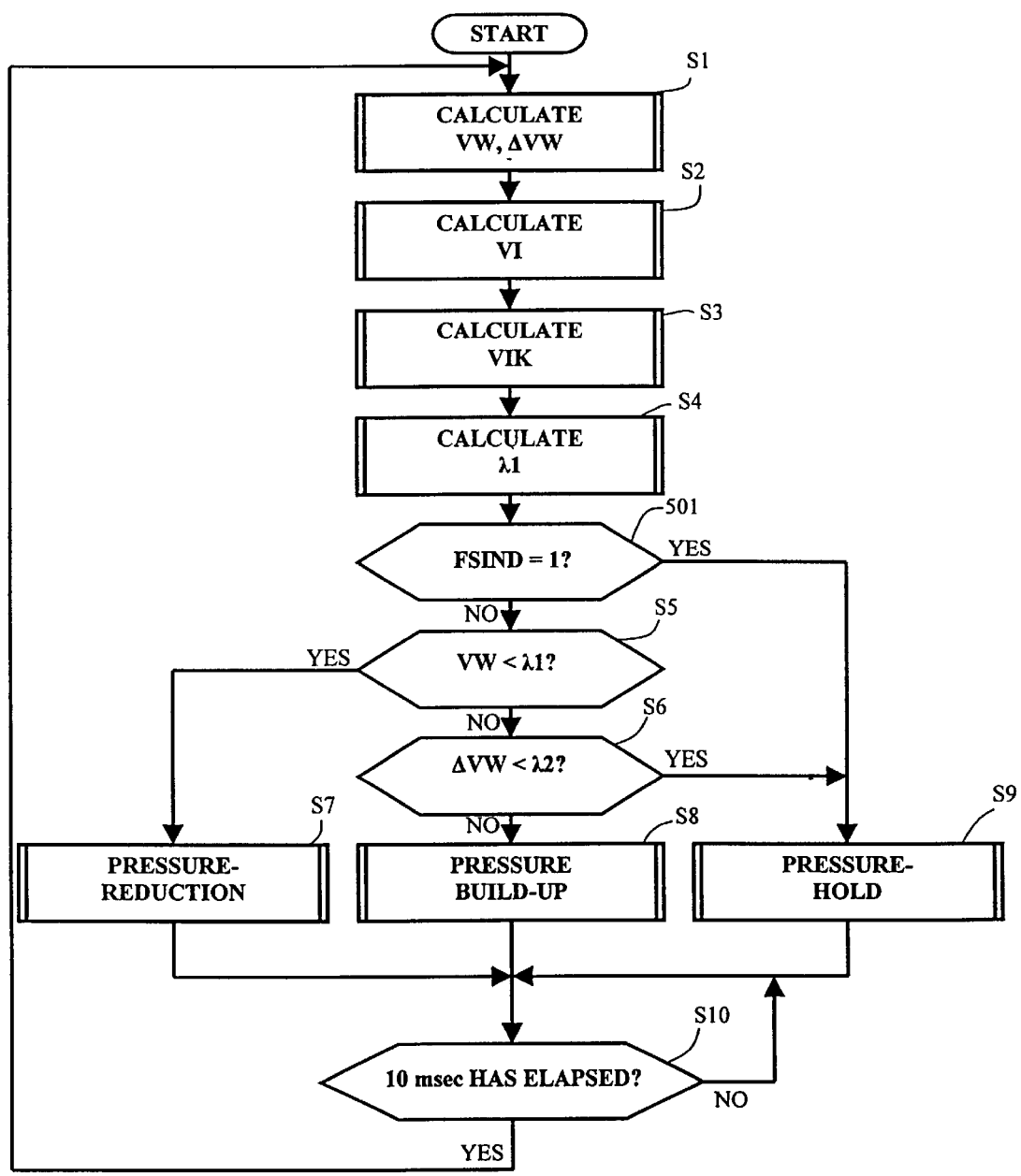
FIG. 12 is a flow chart, showing a main routine of the skid control executed by the anti-skid braking system of a fifth embodiment of the present invention.

Next, the anti-skid braking system that has the road-wheel vibration determining system according to the fifth embodiment of the present invention will be described with a reference to FIG. 12. Steps of this embodiment are given the same reference characters to corresponding steps of the fourth embodiment, and thus, the only differences from the fourth embodiment will be described. According to the fifth embodiment of the present invention, as shown in FIG. 12, the test of determining the drive-train decision flag FSIND is made between an arithmetical calculation of the pressure-reduction threshold value λ1 and a comparison of the wheel speed VW to the pressure-reduction threshold value λ1. That is, after the pressure-reduction threshold value λ1 is arithmetically calculated in the step S4, the program flows to a step 501. In the step 501, the drive-train decision flag FSIND is determined whether the drive-train decision flag FSIND is "1". When an answer of the step 501 is in an affirmative (YES), i.e., in case of FSIND=1, the program flows to the step S9 so as to execute the pressure-hold procedure. On the other hand, when the answer of the step 501 is in a negative (NO), i.e., in case of FSIND≠1, the step S5 is made. According to the fifth embodiment of the present invention, when the drive-train vibration is determined, since the pressure build-up procedure and the pressure-reduction procedure are prohibited, and since the pressure-hold procedure is executed, the hunting of the execution of the skid-control that is one of cause of the drive-train vibration can be resolved. After the drive-train vibration has resolved, since the drive-train decision flag is reset to "0", the pressure build-up procedure and the pressure-reduction procedure are resumed, and thereby, the effective braking can be provided.

Next, the anti-skid braking system that has the road-wheel vibration determining system according to the sixth embodiment of the present invention will be described with a reference to FIGS. 13 through 15. According to the sixth embodiment of the present invention, details of determining the road-wheel vibration is the same as the first embodiment or the second embodiment. Steps of this embodiment are given the same reference characters to corresponding steps of the first embodiment, and thus, the only differences from the first embodiment will be described.

Figure 13:
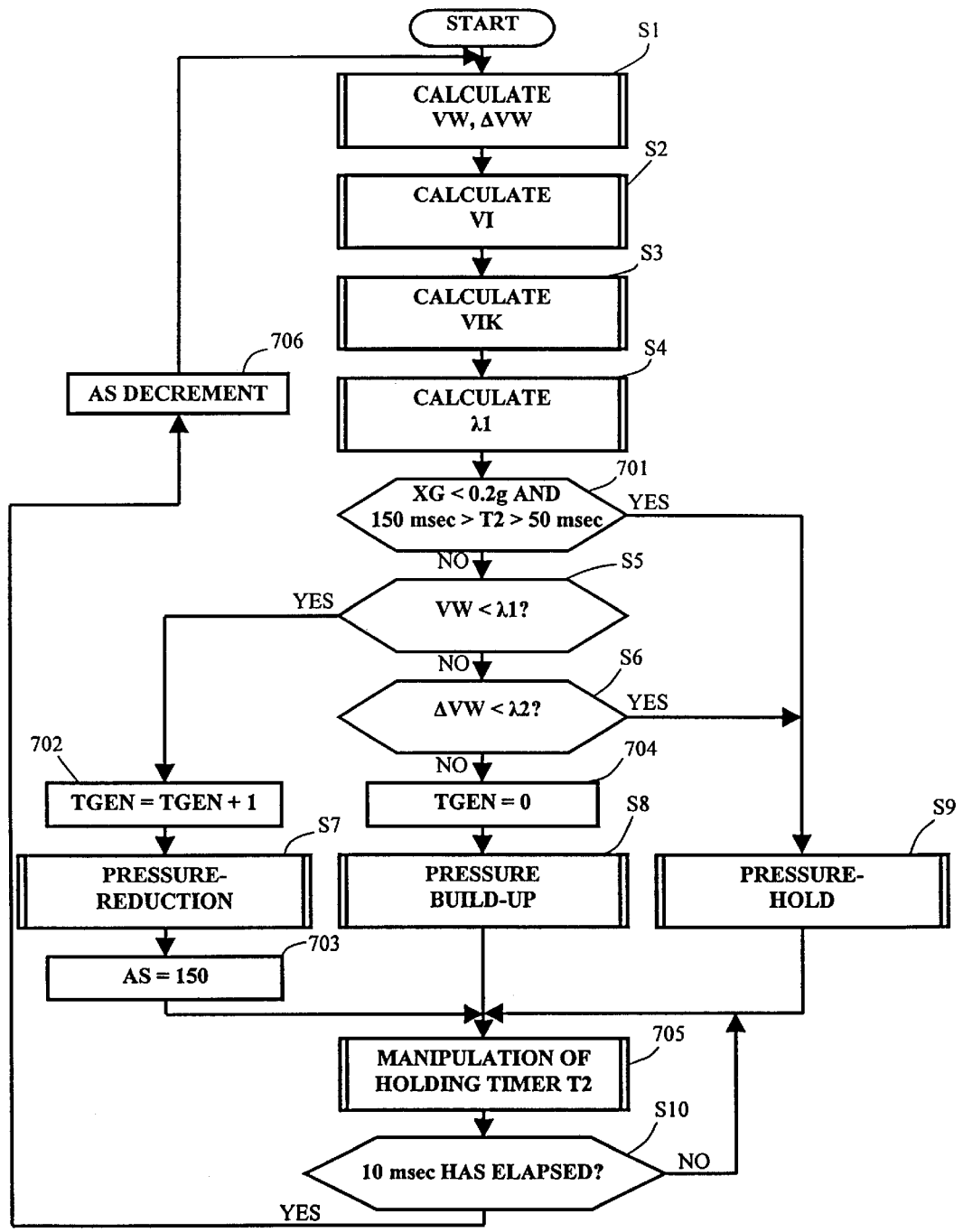
FIG. 13 is a flow chart, showing a main routine of the skid-control executed by the anti-skid braking system of a sixth embodiment of the present invention.
Figure 14:
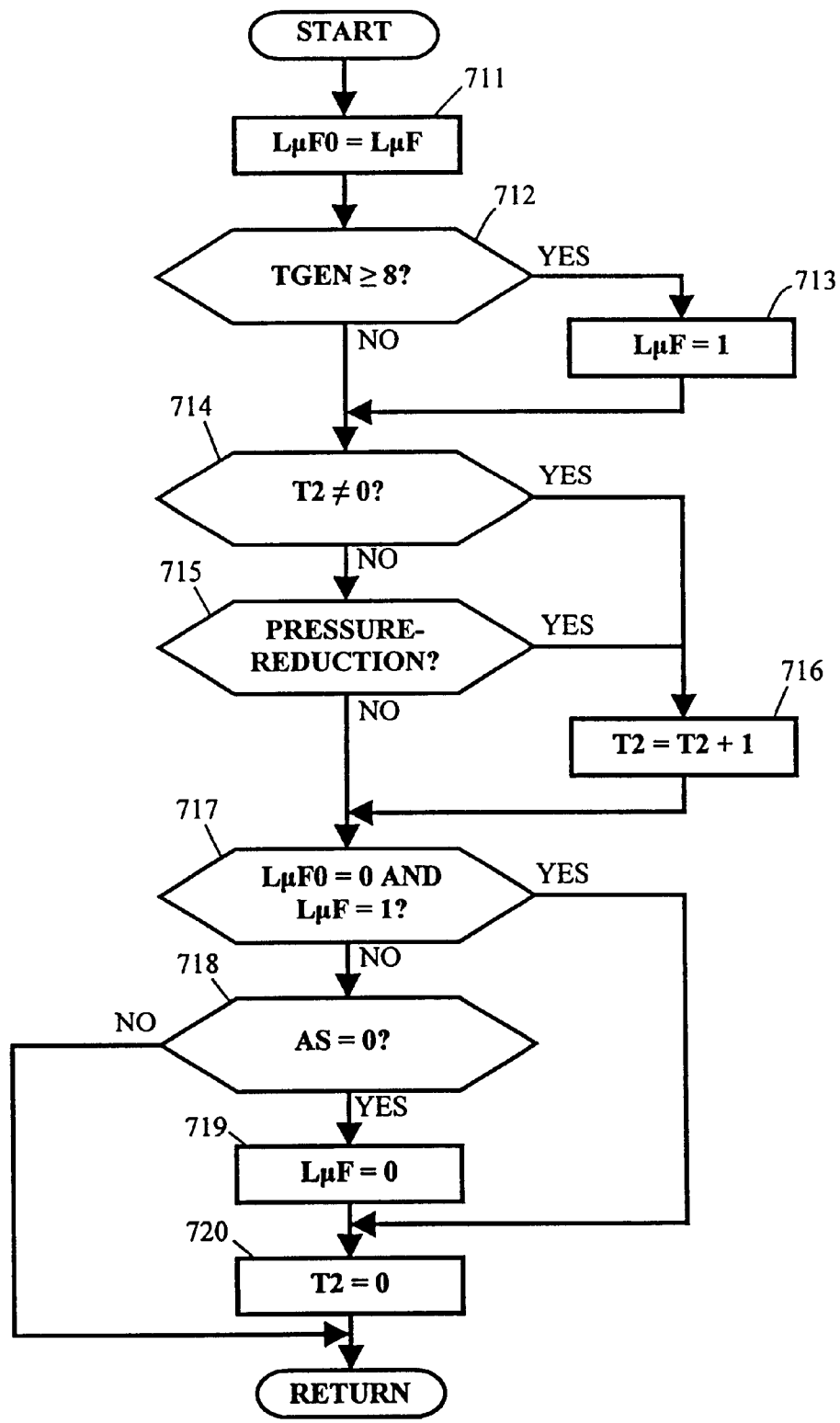
FIG. 14 is a flow chart, showing details of a routine of a manipulation of the holding timer routine of the sixth embodiment.

FIG. 13 shows the main routine of the skid-control. According to the sixth embodiment of the present invention, a step 701 is made after the pressure-reduction threshold value λ1 is calculated in the step S4. In the step 701, a longitudinal acceleration data XG detected from a longitudinal acceleration sensor (not shown) and a value of a holding timer T2 (details will be described later) are compared to determine whether the longitudinal acceleration data XG is smaller than a predetermined value, such as 0.2 g, and whether the value of the holding timer T2 is within a predetermined range, such as 150 msec>T2>50 msec. When a determination of the step 701 is in an affirmative (YES), i.e., in case of XG<0.2 g and 150 msec>T2>50 msec, the program flows to the step S9 so as to execute the pressure-hold procedure. On the other hand, when the answer of the step 701 is in a negative (NO), i.e., in case of XG≧0.2 g, T2≧150 msec, or T2≦50 msec, the program flows to the step S5 so as to compare the wheel speed VW to the pressure-reduction threshold value λ1. In the step S5, the wheel speed VW is compared to the pressure-reduction threshold value λ1 to determine whether the wheel speed VW is smaller than the pressure-reduction threshold value λ1. When a determination of the step S5 is in an affirmative (YES), i.e., in case of VW<λ1, the program flows to a step 702. In the step 702, a pressure-reduction counter TGEN is increased by adding a value "1" to the pressure-reduction counter TGEN of a previous routine, and then, the program flows to the step S7 so as to execute the pressure-reduction procedure. The pressure-reduction counter TGEN is a counter that counts a period of the pressure-reduction procedure. Subsequently to the step S7, in a step 703, an anti-skid control flag AS is set at "150". According to the sixth embodiment of the present invention, a value of the anti-skid control flag AS is decreased by an execution of a step 706 in every routine during an execution of the skid control. On the other hand, when the determination of the step S5 is in a negative (NO), i.e., in case of VW≧λ1, the step S6 is made. In the step S6, the wheel acceleration data ΔVW is compared to the pressure-hold threshold value λ2 so as to determine whether the wheel acceleration data ΔVW is smaller than the pressure-hold threshold value λ2. When a determination of the step S6 is in an affirmative (YES), i.e., in case of ΔVW<λ2, the program flows to the step S9 so as to execute the pressure-hold procedure, and when the determination of the step S6 is in a negative (NO), i.e., in case of ΔVW≧λ2, a step 704 is made. In the step 704, the pressure-reduction counter TGEN is reset to "0". Subsequently to the steps 703, S8, or S9, the program flows to a step 705 so as to execute a manipulation of the holding timer T2. According to the sixth embodiment, the pressure-reduction counter TGEN is added during an execution of the pressure-reduction procedure until the pressure build-up procedure has been executed. In addition, the pressure-hold procedure is forcefully executed when the longitudinal acceleration data XG is less than 0.2 g, and when the holding timer T2 is between 50 msec and 150 msec.

Next, details of the manipulation of the holding timer T2 will be described with a reference to FIG. 14. At a step 711, a low-μ decision flag LμF0 is set so that the low-μ decision flag L$\mu$F0 becomes identical to a $\mu$-jump decision flag L$\mu$F, which shows that the road surface condition changes from high-$\mu$ to low-$\mu$ when the $\mu$-jump decision flag L$\mu$F is set at "1". After this, in a step 712, the pressure-reduction counter TGEN is compared to a predetermined value so as to determine the pressure-reduction counter TGEN is equal or larger than the predetermined value, such as 8, where 8 denotes 80 milliseconds. When a determination of the step 712 is in an affirmative (YES), i.e., in case of TGEN≧8, the program flows to a step 713 so as to set the $\mu$-jump decision flag L$\mu$F at "1". Subsequently to the step 713, the program flows to a step 714. On the other hand, when the determination of the step 712 is in a negative (NO), i.e., in case of TGEN<8, the program flows to the step 714. Thus, when an inequity TGEN≧8 is satisfied at the step 712, the CPU of the ECU determines that the pressure-reduction procedure has been executed during a predetermined period, such as 80 msec, and that the road surface condition has jumped to low-$\mu$ from high-$\mu$, and then, the program flows to the step 713 so as to set the $\mu$-jump decision flag L$\mu$F at "1". According to the sixth embodiment of the present invention, although the pressure-reduction counter TGEN is compared to 80 msec in order to make a decision of whether the road surface condition has changed, it may be compared to an another value, such as 10, that is 10 milliseconds. Furthermore, the decision of whether the road surface condition has jumped to low-$\mu$ from high-$\mu$ may also be determined by detecting that wheel acceleration data $\Delta$VW becomes smaller than −4 g during the skid-control supposed to be executed in the normal road surface condition. At the step 714, a test is made to determine whether the holding timer T2 is other than "0". When an answer of the step 714 is in an affirmative (YES), i.e., in case of T2≠0, the program flows to a step 716 so as to execute an increment of the holding timer value T2 by adding a value "1" to the holding timer T2 of a previous routine. Conversely, when the answer of the step 714 is in a negative (NO), i.e., in case of T2=0, the program flows to a step 715. In the step 715, a test is made to determine whether the pressure-reduction procedure is being executed. When an answer of the step 715 is in an affirmative (YES), that is, the CPU of the ECU has currently been executing the pressure-reduction procedure, the program flows to the step 716, and when the answer of the step 715 is in a negative (NO), that is, the CPU of the ECU has not currently been executing the pressure-reduction procedure, the program flows to a step 717. The program also flows to the step 717 after the step 716 is executed. In the step 717, a test is made to determine whether the low-$\mu$ decision flag L$\mu$F0 is "0" and the $\mu$-jump decision flag L$\mu$F is "1". When a determination of the step 717 is in an affirmative (YES), i.e., in case of L$\mu$F0=0 and L$\mu$F=1, the program flows to a step 720 so as to reset the holding timer T2 to "0". After this, the program finishes a current routine of the manipulation of holding timer T2. Conversely, when the determination of the step 717 is in a negative (NO), i.e., in case of L$\mu$F0≠0 or L$\mu$F ≠1, the program flows to a step 718 so as to determine whether the anti-skid control flag AS is "0", that is, whether the skid-control is not being executed. When a determination of the step 718 is in an affirmative (YES), i.e., in case of AS=0, the program flows to a step 719 so as to reset the low-$\mu$ decision flag L$\mu$F0 to "0". Subsequently to the step 719, the program flows to the step 720. On the other hand, when the determination of the step 718 is in a negative (NO), in case of AS≠0, the program finishes the current routine of the manipulation of the holding timer T2. Therefore, the program of the manipulation of the holding timer T2 flows from the step 711 to the step 718 through the steps 712, 714, 715, 716, and 717 after the pressure-reduction procedure has been started. Thereby, the pressure-hold procedure is forcefully executed between 50 msec and 150 msec after the pressure-reduction procedure has started. Moreover, when the pressure-reduction procedure is being executed until the pressure-reduction counter TGEN has counted "8", the program of manipulation of the holding timer T2 flows from the step 711 to the step 720 through the steps 712, 713, 714, 716, and 717. Thus, the holding timer T2 is temporarily reset to "0" at the step 720. After the step 720 has been executed, the program of the manipulation of the holding timer T2 newly flows from the step 711 to the step 718 through the steps 712, 714, 715, 716, and 717, thus, the holding timer T2 starts to count. Thereby, the pressure-hold procedure is forcefully executed between 50 msec and 150 msec after the holding timer T2 starts to count. After this, since the anti-skid control flag is reset to "0" when the skid-control is finished to execute, the program of the manipulation of the holding timer T2 flows from the step 718 to the step 719, and therefore, the $\mu$-jump decision flag L$\mu$F and the holding timer T2 are reset to "0" at the steps 719 and 720, respectively.

Figure 15:
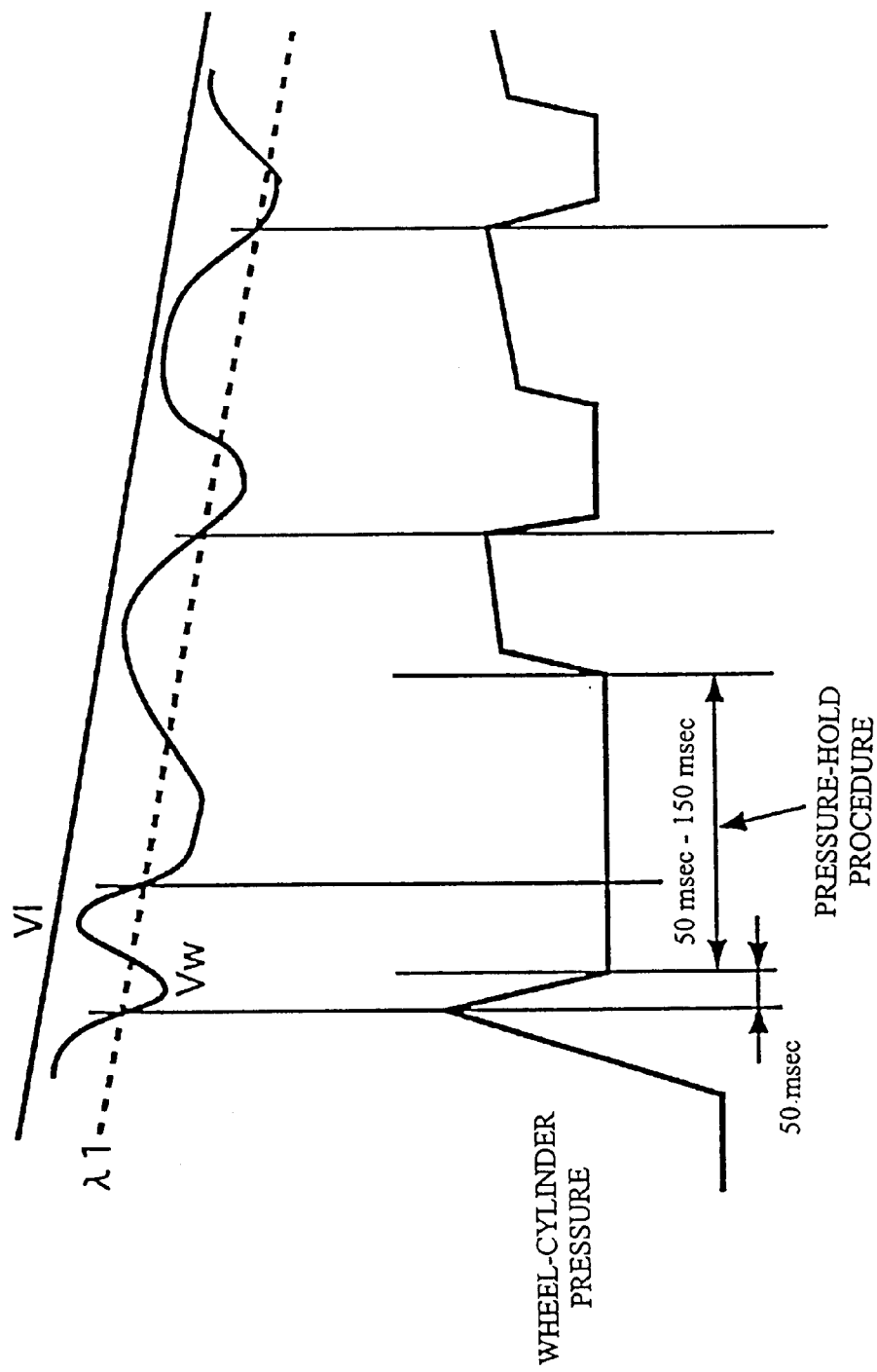
FIGS. 15(a) and 15(b) is a time chart, showing a control characteristic of the vehicle executed by the anti-skid braking system of the sixth embodiment.

As shown in FIGS. 15(*a*) and (*b*), according to the sixth embodiment of the present invention, the pressure build-up procedure and the pressure-reduction procedure are prohibited by executing the pressure-hold procedure between 50 msec and 150 msec after the skid-control has been started, i.e., the initial pressure-reduction procedure has been executed, and after the CPU of the ECU decides that the road surface condition has changed from high-$\mu$ to low-$\mu$. Thereby, a vibration of the wheel speed caused by an interference between the engine torque and the braking force can be prevented. Furthermore, since the pressure-hold procedure is executed while the pressure-reduction procedure and the pressure build-up procedure are prohibited, the wheel-brake cylinder pressure is kept at a certain pressure. Thereby, the braking force is generated, and thus, the tendency of the braking distance to be long can be prevented. In addition, since the longitudinal acceleration data XG detected from the longitudinal acceleration sensor is compared at the step 701 of FIG. 13, a slope can be accurately detected.

While the present invention is described on the basis of certain preferred embodiments, it is not limited thereto, but is defined by the appended claims as interpreted in accordance with applicable law.

This application relates to and incorporates herein by reference Japanese Patent application No. 2000-196390 filed on Jun. 29, 2000, from which priority is claimed.

What is the claimed is:

1. A method of executing an anti-skid braking procedure for an automotive vehicle having a plurality of road wheels comprising the operations of:

(a) detecting a wheel speed of each of said plurality of road wheels;

(b) calculating a wheel acceleration and a wheel deceleration of each of the road wheels;

(c) calculating a wheel acceleration cycle of each of the road wheels;

(d) calculating a vehicle deceleration;

(e) comparing said calculated wheel acceleration to a first predetermined value, and comparing said calculated wheel acceleration cycle to a second predetermined value, and in response to such comparisons, detecting a road-wheel vibration when said calculated wheel acceleration is larger than the first predetermined value, and when said calculated wheel acceleration cycle is smaller than the second predetermined value;

(f) comparing said calculated vehicle deceleration to a third predetermined value, and in response to such comparison, determining that the road-wheel vibration is caused by a bad road surface condition when said calculated vehicle deceleration is larger than the third predetermined value, and that the road-wheel vibration is caused by a drive-train vibration when said calculated vehicle deceleration is smaller than the third predetermined value;

(g) setting a pressure-reduction threshold to determine a timing of executing a pressure-reduction procedure depending on said operations (e) and (f), said operation (g) setting the pressure-reduction threshold at a lower value as compared to a normal road surface condition when the bad road surface condition is determined by said operation (f), and said operation (g) setting the pressure-reduction threshold at a higher value as compared to the normal road surface condition when the drive-train vibration is determined by said operation (f); and (h) executing a skid control by regulating each wheel-brake cylinder pressure, said operation (h) executing a pressure build-up procedure, the pressure-reduction procedure, and a pressure-hold procedure depending on the pressure-reduction threshold set by said operation (g).

2. The method of claim 1, wherein said operation (h) comprises the operations of:

(h1) changing a pressure-rising volume of the wheel brake cylinder depending on said operations (e) and (f), said operation (h1) changing the pressure-rising volume at a higher value as compared to the normal road surface condition when the bad road surface condition is determined by said operation (f), and said operation (h1) changing the pressure rising volume at a lower value as compared to the normal road surface condition when the drive-train vibration is determined by said operation (f); and (h2) changing a pressure-reduction volume of the wheel brake cylinder depending on said operations (e) and (f), said operation (h2) changing the pressure-reduction volume at a lower value as compared to the normal road surface condition when the bad road surface condition is determined by said operation (f).

3. The method of claim 2, wherein said operation (h) further comprises the operation of:

(h3) controlling the pressure build-up procedure, said operation (h3) executing a gradual pressure build-up procedure after an initial pressure build-up procedure is executed, when said operation (h) determines a further pressure build-up procedure is needed; and wherein said operation (h1) changes the pressure-rising volume at least when said operation (h3) executes the initial pressure build-up procedure.

4. The method of claim 3, wherein, when said operation (h1) changes said pressure-rising volume at the higher value, said operation (h1) changes a pressure-rising period at a shorter value as compared to a normal pressure-rising period executed in the normal road surface condition, and, when said operation (h1) changes the pressure-rising volume at the lower value, said operation (h1) changes the pressure-rising period at a longer value as compared to the normal pressure-rising period.

5. The method of claim 4, wherein said operation (h) executes a vibration-preventing procedure within a predetermined period, when said operation (h) executes the skid control, by prohibiting executing the pressure build-up procedure and the pressure-reduction procedure.

6. The method of claim 5, wherein said operation (h) executes the vibration-preventing procedure at least right after an initial pressure-reduction procedure is executed.

7. The method of claim 6, wherein said operation (h) further comprises the operation of:

(h4) detecting a jump of a road surface condition from a high friction to a low friction; and wherein said operation (h) further executes the vibration-preventing procedure when said operation (h4) detects the jump of the road surface condition.

8. The method of claim 7, wherein, when said operation (h) executes the vibration-preventing procedure, said operation (h) executes the pressure-hold procedure.

9. The method of claim 8, wherein said operation (h) executes the vibration-preventing procedure for a half time to three times of a cycle of the drive train vibration.

10. A method of executing an anti-skid braking procedure for an automotive vehicle having a plurality of road wheels comprising the operations of:

(a) detecting a wheel speed of each of said plurality of road wheels;

(b) calculating a wheel acceleration and a wheel deceleration of each of the road wheels, and in response to such calculation, calculating a maximum value of the wheel acceleration;

(c) calculating a wheel acceleration cycle of each of the road wheels;

(d) calculating a wheel acceleration amplitude of each of the road wheels;

(e) comparing said calculated wheel acceleration amplitude to a first predetermined value, and comparing said calculated wheel acceleration cycle to a second predetermined value, and in response to such comparisons, detecting a road-wheel vibration when said calculated wheel acceleration amplitude is larger than the first predetermined value, and when said calculated wheel acceleration cycle is smaller than the second predetermined value;

(f) comparing said calculated maximum value of the wheel acceleration to a third predetermined value, and in response to such comparison, determining that the road-wheel vibration is caused by a bad road surface condition when said calculated maximum value of the wheel acceleration is smaller than the third predetermined value, and that the road-wheel vibration is caused by a drive-train vibration when said calculated maximum value of the wheel acceleration is larger than the third predetermined value;

(g) setting a pressure-reduction threshold to determine a timing of executing a pressure-reduction procedure depending on said operations (e) and (f), said operation (g) setting the pressure-reduction threshold at a lower value as compared to a normal road surface condition when the bad road surface condition is determined by said operation (f), and said operation (g) setting the pressure-reduction threshold at a higher value as compared to the normal road surface condition when the drive-train vibration is determined by said operation (f); and (h) executing a skid control by regulating each wheel-brake cylinder pressure, said operation (h) executing a pressure build-up procedure, the pressure-reduction procedure, and a pressure-hold procedure depending on the pressure-reduction threshold set by said operation (g).

11. The method of claim 10, wherein said operation (h) comprises the operations of:

(h1) changing a pressure-rising volume of the wheel brake cylinder depending on said operations (e) and (f), said operation (h1) changing the pressure-rising volume at a higher value as compared to the normal road surface condition when the bad road surface condition is determined, and said operation (h1) changing the pressure-rising volume at a lower value as compared to the normal road surface condition when the drive-train vibration is determined by said operation (f); and (h2) changing a pressure-reduction volume of the wheel brake cylinder depending on said operations (e) and (f), said operation (h2) changing the pressure-reduction volume at a lower value as compared to the normal road surface condition when the bad road surface condition is determined by said operation (f).

12. The method of claim 11, wherein said operation (h) further comprises the operation of:

(h3) controlling the pressure build-up procedure, said operation (h3) executing a gradual pressure build-up procedure after an initial pressure build-up procedure is executed, when said operation (h) determines a further pressure build-up procedure is needed; and wherein said operation (h1) changes said pressure-rising volume at least when said operation (h3) executes the initial pressure build-up procedure.

13. The method of claim 12, wherein, when said operation (h1) changes the pressure-rising volume at the higher value, said operation (h1) changes a pressure-rising period at a shorter value as compared to a normal pressure-rising period executed in the normal road surface condition, and, when said operation (h1) changes the pressure-rising volume at the lower value, said operation (h1) changes the pressure-rising period at a longer value as compared to the normal pressure-rising period.

14. The method of claim 13, wherein said operation (h) executes a vibration-preventing procedure within a predetermined period, when said operation (h) executes the skid control, by prohibiting executing the pressure build-up procedure and the pressure-reduction procedure.

15. The method of claim 14, wherein said operation (h) executes the vibration-preventing procedure at least right after an initial pressure-reduction procedure is executed.

16. The method of claim 15, wherein said operation (h) further comprises the operation of:

(h4) detecting a jump of a road surface condition from a high friction to a low friction; and wherein said operation (h) further executes the vibration-preventing procedure when said operation (h4) detects the jump of the road surface condition.

17. The method of claim 16, wherein, when said operation (h) executes the vibration-preventing procedure, said operation (h) executes the pressure-hold procedure.

18. The method of claim 17, wherein said operation (h) executes the vibration-preventing procedure for a half time to three times of a cycle of the drive train vibration.

19. An anti-skid braking system for an automotive vehicle having a plurality of road wheels, comprising:

a plurality of wheel-speed sensors, each for detecting the wheel speed of each of the road wheels;

a hydraulic brake unit for regulating wheel-brake cylinder pressure of wheel-brake cylinders mounted to each of the road wheels, said hydraulic brake unit being capable of forming a pressure build-up mode, a pressure-reduction mode, and a pressure-hold mode of each of the wheel-brake cylinders; and a control unit being configured to be electrically connected to said wheel-speed sensors for processing a wheel-speed data signal detected from each of the wheel-speed sensors, said control unit comprising:

a wheel acceleration calculating section for calculating a wheel acceleration and a wheel deceleration of each of the road wheels based on the wheel-speed data signal;

a wheel acceleration cycle calculating section for calculating a wheel acceleration cycle of each of the road wheels;

a vehicle deceleration calculating section for calculating a vehicle deceleration;

a vibration detecting section for detecting a road-wheel vibration of the road wheel based on the wheel acceleration and the wheel acceleration cycle, said vibration detecting section detecting the road-wheel vibration when the wheel acceleration is larger than a first predetermined value, and when the wheel acceleration cycle is smaller than a second predetermined value;

a vibration determining section for determining whether the road-wheel vibration is caused by a bad road surface condition, or the road-wheel vibration is caused by a drive-train vibration of the automotive vehicle, said vibration determining section determining that the road-wheel vibration is caused by the bad road surface condition when the vehicle deceleration is larger than a third predetermined value, and that the road-wheel vibration is caused by the drive-train vibration when the vehicle deceleration is smaller than the third predetermined value;

a pressure-reduction threshold setting section for setting a pressure-reduction threshold to determine a timing of executing a pressure-reduction procedure depending on the road-wheel vibration detected and determined by said vibration detecting section and said vibration determining section, said pressure-reduction threshold setting section setting the pressure-reduction threshold at a lower value as compared to a normal road surface condition when the bad road surface condition is determined by the vibration determining section, said pressure-reduction threshold setting section setting the pressure-reduction threshold at a higher value as compared to the normal road surface condition when the drive-train vibration is determined by said vibration determining section; and a skid control section for preventing a skid of each of the road wheels by regulating each wheel-brake cylinder pressure, said skid control section executing a pressure build-up procedure, the pressure-reduction procedure, and a pressure-hold procedure depending on the pressure-reduction threshold set by said pressure-reduction threshold setting section.

20. The anti-skid braking system according to claim 19, wherein said skid control section comprises a pressure-rising volume changing section for changing a pressure-rising volume depending on the road-wheel vibration detected and determined by said vibration detecting section and said vibration determining section, said pressure-rising volume changing section changes the pressure-rising volume at a higher value as compared to the normal road surface condition when the bad road surface condition is determined by said vibration determining section, and said pressure build-up volume changing section changes the pressure-rising volume at a lower value as compared to the normal road surface condition when the drive-train vibration is determined by said vibration determining section.

21. The anti-skid braking system according to claim 20, wherein said skid control section further comprises a pressure-reduction volume changing section for changing a pressure-reduction volume depending on the road-wheel vibration detected and determined by said vibration detecting section and said vibration determining section, said pressure-reduction volume changing section changes the pressure-reduction volume at a lower value as compared to the normal road surface condition when the bad road surface condition is determined by the vibration determining section.

22. The anti-skid braking system according to claim 21, wherein said skid control section further comprises a pressure build-up procedure control section for controlling a pressure build-up procedure, said pressure build-up procedure control section executes a gradual pressure build-up procedure after an initial pressure build-up procedure is executed, when said skid control section determines a further pressure build-up procedure is needed, and
wherein said pressure-rising volume changing section changes the pressure-rising volume at least when said pressure build-up procedure control section executes the initial pressure build-up procedure.

23. The anti-skid braking system according to claim 22, wherein, when said pressure-rising volume changing section changes the pressure-rising volume at the higher value, said pressure-rising volume changing section changes a pressure-rising period at a shorter value as compared to a normal pressure-rising period executed in the normal road surface condition, and, when said pressure-rising volume changing section changes the pressure-rising volume at the lower value, said pressure-rising volume changing section changes the pressure-rising period at a longer value as compared to the normal pressure-rising period.

24. The anti-skid braking system according to claim 23, wherein said skid control section executes a vibration-preventing procedure within a predetermined period, by prohibiting executing the pressure build-up procedure and the pressure-reduction procedure.

25. The anti-skid braking system according to claim 24, wherein said skid control section executes the vibration-preventing procedure at least right after an initial pressure-reduction procedure is executed.

26. The anti-skid braking system according to claim 25, wherein said skid control section further comprises a road surface condition detecting section for detecting a jump of a road surface condition from a high friction to a low friction, and
wherein said skid control section further executes the vibration-preventing procedure when said road surface condition detecting section detects the jump of the road surface condition.

27. The anti-skid braking system according to claim 26, wherein, when said skid control section executes the vibration-preventing procedure, said skid control section executes the pressure-hold procedure.

28. The anti-skid braking system according to claim 27, wherein said skid control section executes the vibration-preventing procedure for a half time to three times of a cycle of the drive train vibration.

29. An anti-skid braking system for an automotive vehicle having a plurality of road wheels, comprising:
a plurality of wheel-speed sensors, each for detecting the wheel speed of each of the road wheels;
a hydraulic brake unit for regulating wheel-brake cylinder pressure of wheel-brake cylinders mounted to each of the road wheels, said hydraulic brake unit being capable of forming a pressure build-up mode, a pressure-reduction mode, and a pressure-hold mode of each of the wheel-brake cylinders; and
a control unit being configured to be electrically connected to said wheel-speed sensors for processing a wheel-speed data signal detected from each of the wheel-speed sensors, said control unit comprising:
a wheel acceleration calculating section for calculating a wheel acceleration and a wheel deceleration of each of the road wheels based on the wheel-speed data signal;
a wheel acceleration cycle calculating section for calculating a wheel acceleration cycle of each of the road wheels;
a wheel acceleration amplitude calculating section for calculating a wheel acceleration amplitude of each of the road wheels;
a vibration detecting section for detecting a road-wheel vibration of the road wheel based on the wheel acceleration cycle and the wheel acceleration amplitude, said vibration detecting section detecting the road-wheel vibration when the wheel acceleration amplitude is larger than a first predetermined value, and when the wheel acceleration cycle is smaller than a second predetermined value;
a vibration determining section for determining whether the road-wheel vibration is caused by a bad road surface condition, or the road wheel vibration is caused by a drive-train vibration of the automotive vehicle, based on a maximum value of the wheel acceleration calculated by said wheel acceleration calculating section, said vibration determining section determining that the road-wheel vibration is caused by the drive-train vibration when the maximum value of the wheel acceleration is larger than a third predetermined value, and that the road-wheel vibration is caused by the bad road surface condition when the maximum value of the wheel acceleration is smaller than the third predetermined value;
a pressure-reduction threshold setting section for setting a pressure-reduction threshold to determine a timing of executing a pressure-reduction procedure depending on the road-wheel vibration detected and determined by said vibration detecting section and said vibration determining section, said pressure-reduction threshold setting section setting the pressure-reduction threshold at a lower value as compared to a normal road surface condition when the bad road surface condition is determined by the vibration determining section, said pressure-reduction threshold setting section setting the pressure-reduction threshold at a higher value as compared to the normal road surface condition when the drive-train vibration is determined by said vibration determining section; and
a skid control section for preventing a skid of each of the road wheels by regulating each wheel-brake cylinder pressure, said skid control section executing a pressure build-up procedure, the pressure-reduction procedure, and a pressure-hold procedure depending on the pressure-reduction threshold set by said pressure-reduction threshold setting section.

30. The anti-skid braking system according to claim 29, wherein said skid control section comprises a pressure-rising volume changing section for changing a pressure-rising volume depending on the road-wheel vibration detected and determined by said vibration detecting section and said vibration determining section, said pressure-rising volume changing section changes the pressure-rising volume at a higher value as compared to the normal road surface condition when the bad road surface condition is determined by said vibration determining section, and said pressure build-up volume changing section changes the pressure-rising volume at a lower value as compared to the normal road surface condition when the drive-train vibration is determined by said vibration determining section.

31. The anti-skid braking system according to claim 30, wherein said skid control section further comprises a pressure-reduction volume changing section for changing a pressure-reduction volume depending on the road-wheel vibration detected and determined by said vibration detecting section and said vibration determining section, said pressure-reduction volume changing section changes the pressure-reduction volume at a lower value as compared to the normal road surface condition when the bad road surface condition is determined by the vibration determining section.

32. The anti-skid braking system according to claim 31, wherein said skid control section further comprises a pressure build-up procedure control section for controlling a pressure build-up procedure, said pressure build-up procedure control section executes a gradual pressure build-up procedure after an initial pressure build-up procedure is executed, when said skid control section determines a further pressure build-up procedure is needed, and wherein said pressure-rising volume changing section changes the pressure-rising volume at least when said pressure build-up procedure control section executes the initial pressure build-up procedure.

33. The anti-skid braking system according to claim 32, wherein, when said pressure-rising volume changing section changes the pressure-rising volume at the higher value, said pressure-rising volume changing section changes a pressure-rising period at a shorter value as compared to a normal pressure-rising period executed in the normal road surface condition, and, when said pressure-rising volume changing section changes the pressure-rising volume at the lower value, said pressure-rising volume changing section changes the pressure-rising period at a longer value as compared to the normal pressure-rising period.

34. The anti-skid braking system according to claim 33, wherein said skid control section executes a vibration-preventing procedure within a predetermined period, when said skid control section executes the skid control, by prohibiting executing the pressure build-up procedure and the pressure-reduction procedure.

35. The anti-skid braking system according to claim 34, wherein said skid control section executes the vibration-preventing procedure at least right after an initial pressure-reduction procedure is executed.

36. The anti-skid braking system according to claim 35, wherein said skid control section further comprises a road surface condition detecting section for detecting a jump of a road surface condition from a high friction to a low friction, and wherein said skid control section further executes the vibration-preventing procedure when said road surface condition detecting section detects the jump of the road surface condition.

37. The anti-skid braking system according to claim 36, wherein, when said skid control section executes the vibration-preventing procedure, said skid control section executes the pressure-hold procedure.

38. The anti-skid braking system according to claim 37, wherein said skid control section executes the vibration-preventing procedure for a half time to three times of a cycle of the drive train vibration.

39. An anti-skid braking system for an automotive vehicle having a plurality of road wheels, comprising:

a plurality of wheel-speed sensors, each for detecting the wheel speed of each of the road wheels;

a hydraulic brake unit for regulating wheel-brake cylinder pressure of wheel-brake cylinders mounted to each of the road wheels, said hydraulic brake unit being capable of forming a pressure build-up mode, a pressure-reduction mode, and a pressure-hold mode of each of the wheel-brake cylinders; and a control unit being configured to be electrically connected to said wheel-speed sensors for processing a wheel-speed data signal detected from each of the wheel-speed sensors, said control unit comprising:

a wheel acceleration calculating section for calculating a wheel acceleration and a wheel deceleration of each of the road wheels based on the wheel-speed data signal;

a wheel acceleration cycle calculating section for calculating a wheel acceleration cycle of each of the road wheels;

a vehicle deceleration calculating section for calculating a vehicle deceleration; a vibration detecting section for detecting a road-wheel vibration of the road wheel based on the wheel acceleration and the wheel acceleration cycle, said vibration detecting section detecting the road-wheel vibration when the wheel acceleration is larger than a first predetermined value, and when the wheel acceleration cycle is smaller than a second predetermined value;

a vibration determining section for determining whether the road-wheel vibration is caused by a bad road surface condition, or the road-wheel vibration is caused by a drive-train vibration of the automotive vehicle, said vibration determining section determining that the road-wheel vibration is caused by the bad road surface condition when the vehicle deceleration is larger than a third predetermined value, and that the road-wheel vibration is caused by the drive-train vibration when the vehicle deceleration is smaller than the third predetermined value;

a pressure-reduction threshold setting section for setting a pressure-reduction threshold to determine a timing of executing a pressure-reduction procedure depending on the road-wheel vibration detected and determined by said vibration detecting section and said vibration determining section, said pressure-reduction threshold setting section setting the pressure-reduction threshold at a lower value as compared to a normal road surface condition when the bad road surface condition is determined by the vibration determining section, said pressure-reduction threshold setting section setting the pressure-reduction threshold at a higher value as compared to the normal road surface condition when the drive-train vibration is determined by said vibration determining section; and a skid control section for preventing a skid of each of the road wheels by regulating each wheel-brake cylinder pressure, said skid control section executing a pressure build-up procedure, the pressure-reduction procedure, and a pressure-hold procedure depending on the pressure-reduction threshold set by said pressure-reduction threshold setting section, said skid control section prohibiting the pressure build-up procedure within a predetermined period at least right after an initial pressure-reduction procedure is executed, when the drive-train vibration is determined by said vibration determining section, and said skid control section comprising:

a pressure build-up procedure control section for controlling the pressure build-up procedure, said pressure build-up procedure control section executing a gradual pressure build-up procedure after an initial pressure build-up procedure is executed, when said skid control section determines a further pressure build-up procedure is needed;

a pressure-rising volume changing section for changing a pressure-rising volume depending on the road-wheel vibration detected and determined by said vibration detecting section and said vibration determining section, said pressure-rising volume changing section changing the pressure-rising volume at a higher value as compared to the normal road surface condition when the bad road surface condition is determined by said vibration determining section, said pressure-rising volume changing section changing the pressure-rising volume at a lower value as compared to the normal road surface condition when the drive-train vibration is determined by said vibration determining section, said pressure-rising volume changing section changing the pressure-rising volume at least when said pressure build-up procedure control section executes the initial pressure build-up procedure, said pressure-rising volume changing section changing a pressure-rising period at a shorter value as compared to a normal pressure-rising period executed in the normal road surface condition when said pressure-rising volume changing section changes the pressure-rising volume at the higher value, said pressure-rising volume changing section changing the pressure-rising period at a longer value as compared to the normal pressure-rising period when said pressure-rising volume changing section changes the pressure-rising volume at the lower value; and a pressure-reduction volume changing section for changing a pressure-reduction volume depending on the road-wheel vibration detected and determined by said vibration detecting section and said vibration determining section, said pressure-reduction volume changing section changing the pressure-reduction volume at a lower value as compared to the normal road surface condition when the bad road surface condition is determined by the vibration determining section.

40. The anti-skid braking system according to claim 39, wherein said skid control section prohibits executing the pressure build-up procedure and the pressure-reduction procedure within the predetermined period, when the drive-train vibration is determined by said vibration determining section.

41. The anti-skid braking system according to claim 40, wherein, when said skid control section prohibits executing the pressure build-up procedure and the pressure-reduction procedure, said skid control section executes the pressure-hold procedure.

42. The anti-skid braking system according to claim 41, wherein said skid control section further comprises a road surface condition detecting section for detecting a jump of a road surface condition from a high friction to a low friction, and wherein said skid control section further executes the pressure-hold procedure within the predetermined period when said road surface condition detecting section detects the jump of the road surface condition.

43. The anti-skid braking system according to claim 42, wherein said skid control section executes the pressure-hold procedure for a half time to three times of a cycle of the drive train vibration, when the drive train vibration is determined by said vibration determining section, or when the jump of the road surface condition is detected by said road surface condition detecting section.

44. An anti-skid braking system for an automotive vehicle having a plurality of road wheels, comprising:

a plurality of wheel-speed sensors, each for detecting the wheel speed of each of the road wheels;

a hydraulic brake unit for regulating wheel-brake cylinder pressure of wheel-brake cylinders mounted to each of the road wheels, said hydraulic brake unit being capable of forming a pressure build-up mode, a pressure-reduction mode, and a pressure-hold mode of each of the wheel-brake cylinders; and a control unit being configured to be electrically connected to said wheel-speed sensors for processing a wheel-speed data signal detected from each of the wheel-speed sensors, said control unit comprising:

a wheel acceleration calculating section for calculating a wheel acceleration and a wheel deceleration of each of the road wheels based on the wheel-speed data signal;

a wheel acceleration cycle calculating section for calculating a wheel acceleration cycle of each of the road wheels;

a wheel acceleration amplitude calculating section for calculating a wheel acceleration amplitude of each of the road wheels;

a vibration detecting section for detecting a road-wheel vibration of the road wheel based on the wheel acceleration cycle and the wheel acceleration amplitude, said vibration detecting section detecting the road-wheel vibration when the wheel acceleration amplitude is larger than a first predetermined value, and when the wheel acceleration cycle is smaller than a second predetermined value;

a vibration determining section for determining whether the road-wheel vibration is caused by a bad road surface condition, or the road-wheel vibration is caused by a drive-train vibration of the automotive vehicle, based on a maximum value of the wheel acceleration calculated by said wheel acceleration calculating section, said vibration determining section determining that the road-wheel vibration is caused by the drive-train vibration when the maximum value of the wheel acceleration is larger than a third predetermined value, and that the road-wheel vibration is caused by the bad road surface condition when the maximum value of the wheel acceleration is smaller than the third predetermined value;

a pressure-reduction threshold setting section for setting a pressure-reduction threshold to determine a timing of executing a pressure-reduction procedure depending on the road-wheel vibration detected and determined by said vibration detecting section and said vibration determining section, said pressure-reduction threshold setting section setting the pressure-reduction threshold at a lower value as compared to a normal road surface condition when the bad road surface condition is determined by the vibration determining section, said pressure-reduction threshold setting section setting the pressure-reduction threshold at a higher value as compared to the normal road surface condition when the drive-train vibration is determined by said vibration determining section; and a skid control section for preventing a skid of each of the road wheels by regulating each wheel-brake cylinder pressure, said skid control section executing a pressure build-up procedure, the pressure-reduction procedure, and a pressure-hold procedure depending on the pressure-reduction threshold set by said pressure-reduction threshold setting section, said skid control section prohibiting the pressure build-up procedure within a predetermined period at least right after an initial pressure-reduction procedure is executed, when the drive-train vibration is determined by said vibration determining section, and said skid control section comprising:

a pressure build-up procedure control section for controlling the pressure build-up procedure, said pressure build-up procedure control section executes a gradual pressure build-up procedure after an initial pressure build-up procedure is executed, when said skid control section determines a further pressure build-up procedure is needed;

a pressure-rising volume changing section for changing a pressure-rising volume depending on the road-wheel vibration detected and determined by said vibration detecting section and said vibration determining section, said pressure-rising volume changing section changing the pressure-rising volume at a higher value as compared to the normal road surface condition when the bad road surface condition is determined by said vibration determining section, said pressure-rising volume changing section changing the pressure-rising volume at a lower value as compared to the normal road surface condition when the drive-train vibration is determined by said vibration determining section, said pressure-rising volume changing section changing the pressure-rising volume at least when said pressure build-up procedure control section executes the initial pressure build-up procedure, said pressure-rising volume changing section changing a pressure-rising period at a shorter value as compared to a normal pressure-rising period executed in the normal road surface condition when said pressure-rising volume changing section changes the pressure-rising volume at the higher value, said pressure-rising volume changing section changing the pressure-rising period at a longer value as compared to the normal pressure-rising period when said pressure-rising volume changing section changes the pressure-rising volume at the lower value; and a pressure-reduction volume changing section for changing a pressure-reduction volume depending on the road-wheel vibration detected and determined by said vibration detecting section and said vibration determining section, said pressure-reduction volume changing section changing the pressure-reduction volume at a lower value as compared to the normal road surface condition when the bad road surface condition is determined by the vibration determining section.

45. The anti-skid braking system according to claim 44, wherein said skid control section prohibits executing the pressure build-up procedure and the pressure-reduction procedure within the predetermined period when the drive-train vibration is determined by said vibration determining section.

46. The anti-skid braking system according to claim 45, wherein, when said skid control section prohibits executing the pressure build-up procedure and the pressure-reduction procedure, said skid control section executes the pressure-hold procedure.

47. The anti-skid braking system according to claim 46, wherein said skid control section further comprises a road surface condition detecting section for detecting a jump of a road surface condition from a high friction to a low friction, and wherein said skid control section further executes the pressure-hold procedure within the predetermined period when said road surface condition detecting section detects the jump of the road surface condition.

48. The anti-skid braking system according to claim 47, wherein said skid control section executes the pressure-hold procedure for a half time to three times of a cycle of the drive-train vibration, when the drive-train vibration is determined by said vibration determining section, or when the jump of the road surface condition is detected by said road-surface condition detecting section.

* * * * *